United States Patent [19]

Kadwell et al.

[11] Patent Number: 5,324,918
[45] Date of Patent: * Jun. 28, 1994

[54] CONTROL UNIT AND METHOD OF MAKING THE SAME

[75] Inventors: Brian J. Kadwell, Holland; Daniel L. Fowler, Kentwood; Gregory F. Gawron, Holland, all of Mich.

[73] Assignee: Robertshaw Controls Company, Richmond, Va.

[*] Notice: The portion of the term of this patent subsequent to Nov. 1, 2005 has been disclaimed.

[21] Appl. No.: 877,314

[22] Filed: May 1, 1992

Related U.S. Application Data

[62] Division of Ser. No. 621,998, Dec. 4, 1990, Pat. No. 5,126,537, which is a division of Ser. No. 444,444, Nov. 30, 1989, Pat. No. 4,994,653, which is a division of Ser. No. 259,189, Oct. 18, 1988, Pat. No. 4,899,034, which is a division of Ser. No. 939,872, Dec. 10, 1986, Pat. No. 4,782,215.

[51] Int. Cl.$^5$ .............................................. H05B 1/02
[52] U.S. Cl. .................................... 219/506; 219/497; 219/505; 219/508; 219/486
[58] Field of Search ............... 219/501, 494, 497, 505, 219/508, 509, 506, 483–486, 503; 307/117

[56] References Cited

U.S. PATENT DOCUMENTS

| | | | |
|---|---|---|---|
| 3,566,079 | 2/1971 | O'Neill | 219/505 |
| 3,878,358 | 4/1975 | Barton et al. | 219/505 |
| 4,314,143 | 2/1982 | Bilstad et al. | 219/506 |
| 4,367,399 | 1/1983 | Anthony et al. | 219/505 |
| 4,415,800 | 11/1983 | Dodge et al. | 219/497 |
| 4,644,137 | 2/1987 | Asahi et al. | 219/497 |
| 5,126,537 | 6/1992 | Kadwell et al. | 219/501 |

*Primary Examiner*—Mark H. Paschall
*Attorney, Agent, or Firm*—Candor, Candor & Tassone

[57] ABSTRACT

A temperature regulating control unit and method of making the same are provided, the unit comprising a RTD temperature sensor, a unit for applying electrical signals to the sensor, and a microcomputer for receiving digital signals from the sensor in relation to the temperature being sensed by the sensor, the unit for applying electrical signals to the sensor applying a varying voltage to the sensor.

9 Claims, 9 Drawing Sheets

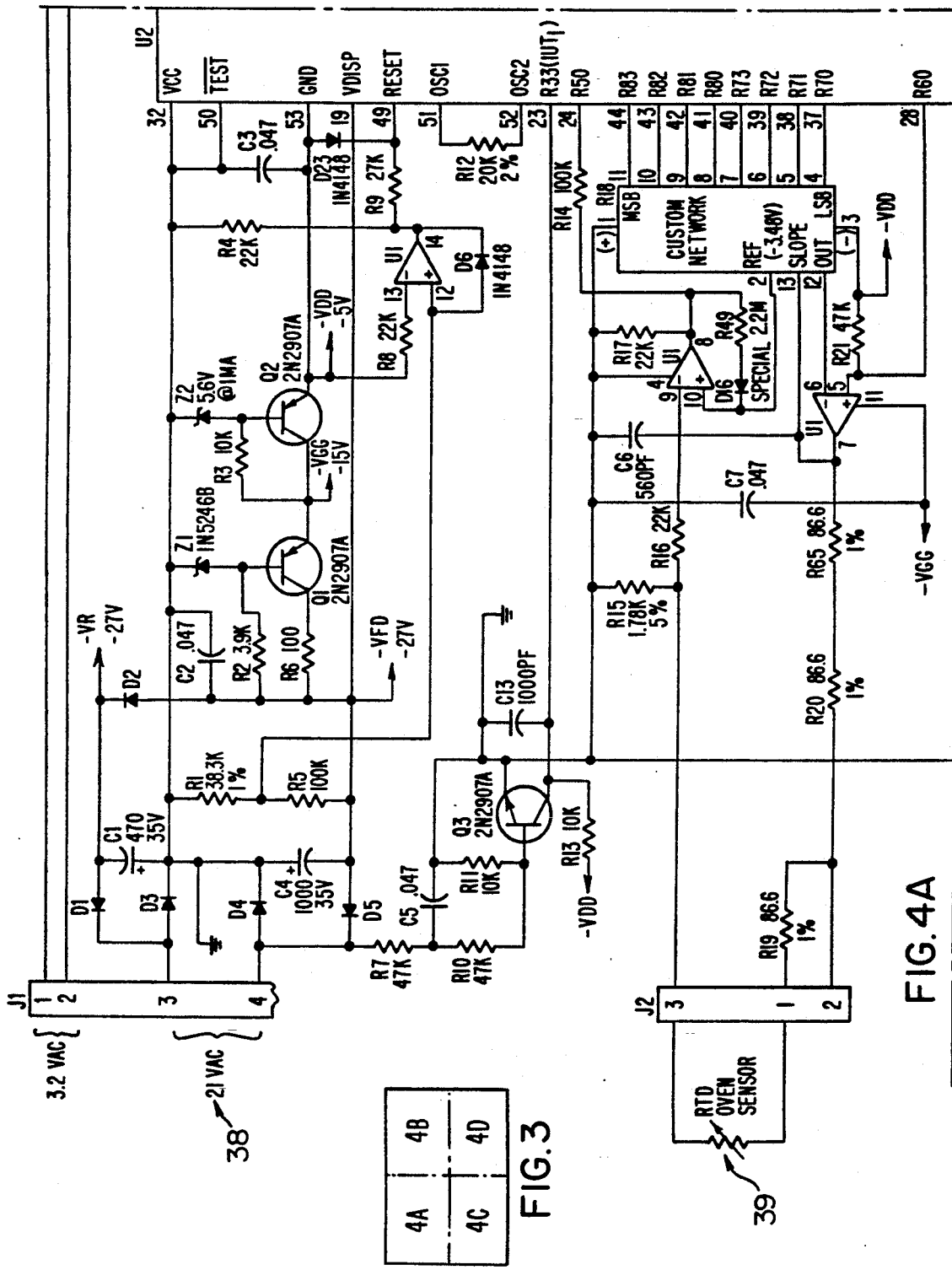

CLEAN MODE TEMPERATURE ACTION POINTS.

BROIL MODE TEMPERATURE ACTION POINTS.

BAKE MODE TEMPERATURE ACTION POINTS.

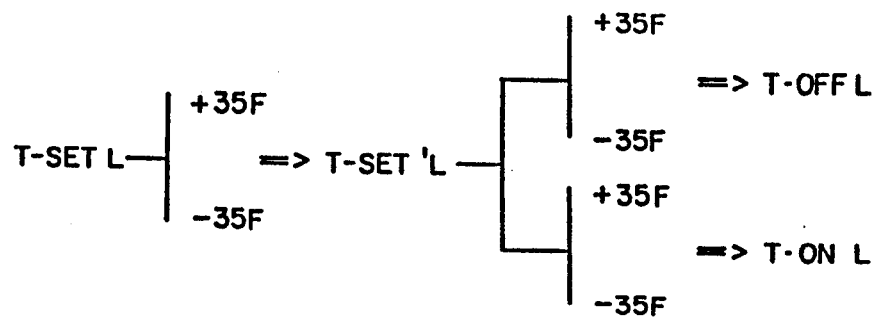
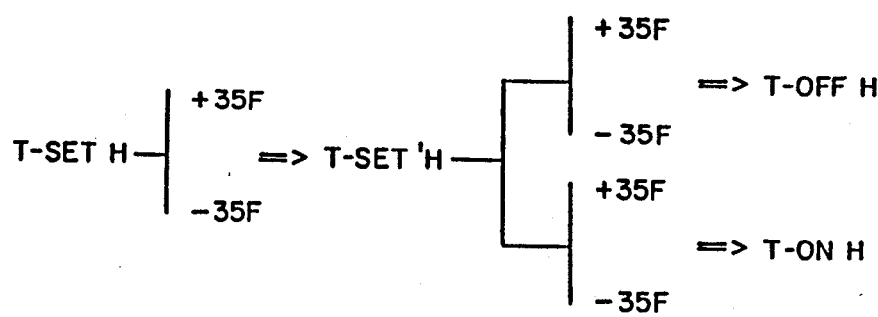
FORMATION OF ELEMENT RELAY T-ON AND T-OFF TEMPERATURES.
FIG. 9
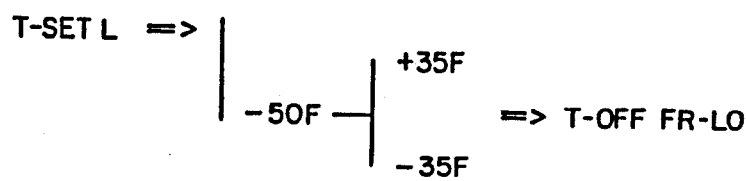
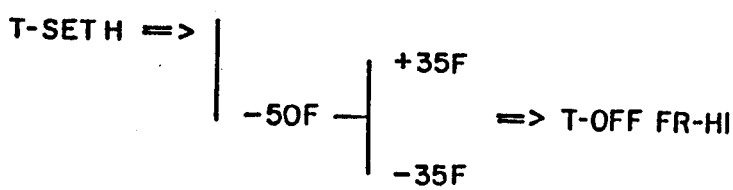
BAKE MODE FIRST RISE COMPENSATION ACTION POINTS.
FIG. 10

CONTROL UNIT AND METHOD OF MAKING THE SAME

CROSS REFERENCE TO RELATED APPLICATION

This application is a divisional patent application of its copending parent patent application, Ser. No. 621,998, filed Dec. 4, 1990, now U.S. Pat. No. 5,126,537, which, in turn, is a divisional patent application of its copending parent patent application Ser. No. 444,444, filed Nov. 30, 1989, now U.S. Pat. No. 4,994,653, which, in turn, is a divisional patent application of its copending parent patent application, Ser. No. 259,189, filed Oct. 18, 1988, now U.S. Pat. No. 4,899,034, which, in turn is a divisional patent application of its copending parent patent application, Ser. No. 939,872, filed Dec. 10, 1986, now U.S. Pat. No. 4,782,215.

BACKGROUND OF THE INVENTION

1. Field of the Invention

This invention relates to a new control unit and a new method of making the control unit, the control unit being particularly adapted to be utilized for controlling the operation of a cooking apparatus or the like.

2. Prior Art Statement

It is known to provide a temperature regulating control unit comprising a RTD temperature sensor, means for applying electrical signals to the sensor, and a microcomputer for receiving digital signals from the sensor in relation to the temperature being sensed by the sensor, the means for applying electrical signals to the sensor applying constant current to the sensor.

It is also known to provide a control unit comprising a high energy control circuit means having an output relay driver transistor, manually operated means for initiating the operation of the high energy control circuit means, microcomputer means for operating the high energy control circuit means after the manually operated means has initiated the operation thereof, and supervisory circuit means for detecting dynamic failure of the microcomputer means and disabling the high energy control circuit means if the microcomputer means is not operating in a normal mode thereof, the supervisory circuit means having means requiring the manual operation of the manually operated means before permitting power to reach the high energy control circuit means whereby the high energy circuit means is disabled unless the manual operation of the manually operated means has taken place and the microcomputer means is operating in the normal mode thereof. For example, see Fowler U.S. Pat. No. 4,611,295.

SUMMARY OF THE INVENTION

It is a feature of this invention to provide a new temperature regulating control unit that is less costly and requires fewer and less critical components than prior known temperature regulating control units that utilize a constant current to excite the sensor.

In particular, it was found according to the teachings of this invention that an RTD temperature sensor can have a varying voltage applied thereto and such temperature sensor can be utilized to apply digital signals to a microcomputer in relation to the temperature being sensed by the sensor.

For example, one embodiment of this invention provides a temperature regulating control unit comprising an RTD temperature sensor, means for applying electrical signals to the sensor, and a microcomputer for receiving digital signals from the sensor in relation to the temperature being sensed by the sensor, the means for applying electrical signals to the sensor applying a varying voltage to the sensor.

It is another feature of this invention to provide a control unit having a unique supervisory circuit means for monitoring the high energy control circuit means thereof.

In particular, it was found according to the teachings of this invention that a comparator of a prior known supervisory circuit means could be eliminated and that a supervisory transistor of the supervisory circuit means could be disposed in series with the output relay driver transistor of the high energy control circuit means with the requirement that the supervisory transistor must be switched on to enable the relay driver transistor.

For example, another embodiment of this invention provides a control unit comprising a high energy control circuit means having an output relay driver transistor, manually operated means for initiating the operation of the high energy control circuit means, microcomputer means for operating the high energy control circuit means after the manually operated means has initiated the operation thereof, and supervisory circuit means for detecting dynamic failure of the microcomputer means and disabling the high energy control circuit means if the microcomputer means is not operating in a normal mode thereof, the supervisory circuit means having means requiring the manual operation of the manually operated means before permitting power to reach the high energy control circuit means whereby the high energy control circuit means is disabled unless the manual operation of the manually operated means has taken place and the microcomputer means is operating in the normal mode thereof, the supervisory circuit means having a supervisory transistor therein that is in series with the relay driver transistor and that must be switched on to enable the relay driver transistor.

Accordingly, it is an object of this invention to provide a new control unit having one or more of the novel features of this invention as set forth above or hereinafter shown or described.

Another object of this invention is to provide a new method of making such a control unit, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 3 is a block diagram illustrating how FIGS. 4A, 4B, 4C and 4D are to arranged in order to illustrate the entire circuit me of the control unit of FIG. 1.

FIGS. 4A, 4B, 4C and 4D respectively illustrate parts of the entire electrical circuit means of the control unit of FIG. 1. FIGS. 4A–4D being adapted to be arranged in the manner illustrated in FIG. 3 to provide the entire circuit means for the control unit of FIG. 1.

FIG. 9 is a bar graph that illustrates the formation of the heating element relay T-on and T-off temperatures of the control unit of FIG. 1.

FIG. 10 is a bar graph that illustrates the bake mode first temperature rise compensation action points of the control unit of FIG. 1.

DESCRIPTION OF THE PREFERRED EMBODIMENT

Figure 1:
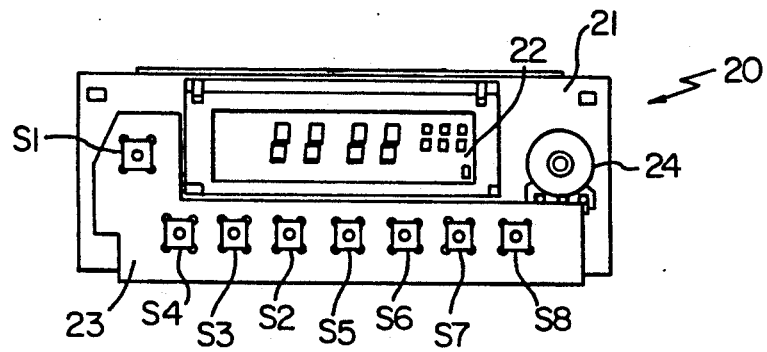
FIG. 1 is a schematic front view of a control unit of this invention.

While the various features of this invention are hereinafter illustrated and described as being particularly adapted to provide a control unit for controlling a domestic cooking oven or the like, it is to be understood that the various features of this invention can be utilized singly or in any combination thereof to provide a control unit for controlling other apparatus or appliances as desired.

Therefore, this invention is not to be limited to only the embodiment illustrated in the drawings, because the drawings are merely utilized to illustrate one of the wide variety of uses of this invention.

Referring now to FIG. 1, the new control unit of this invention is generally indicated by the reference numeral 20 and comprises a frame means 21 having a visual display means 22, such as the well known vacuum fluorescent display means as set forth in the Fowler U.S. Pat. No. 4,568,927, and a user interface means 23 that comprise a rotary switch 24, such as one of the rotary switches as set forth in the Fowler U.S. Pat. No. 4,625,084, and eight momentary contact push buttons S1, S2, S3, S4, S5, S6, S7 and S8 of conventional design that remain in a normally open condition when released and therefore must be held closed by the user in a manner well known in the art whereby the aforementioned two U.S. Pat. Nos. 4,568,927 and 4,625,084, are being incorporated into this disclosure by the reference thereto.

The control unit 20 is a solid state, microcomputer based device capable of providing several advanced functions for home use, self-cleaning ovens. When used in conjunction with the appropriate temperature sensor and power interface circuitry, the control unit 20 provides the following main functions: Time of Day Clock; Minute Timer with Alarm; Control of Oven Temperature in Bake, Broil, and Self-clean modes; Automatic Self-clean Mode; Delay Start of Clean and Bake Modes; and Timed Bake Modes. Data entry is accomplished with the eight function keys S1-S8 in conjunction with the rotary switch 24. The user selects a function with one of the keys S1-S8 and then enters data via the rotary switch 24, in the manner fully set forth in the aforementioned patents. Information is displayed to the user by means of the vacuum fluorescent display 22. Time and oven temperature information is displayed simultaneously. The display 22 is color coded for ease of identification with time information being blue-green and temperature information being red.

Figure 2:
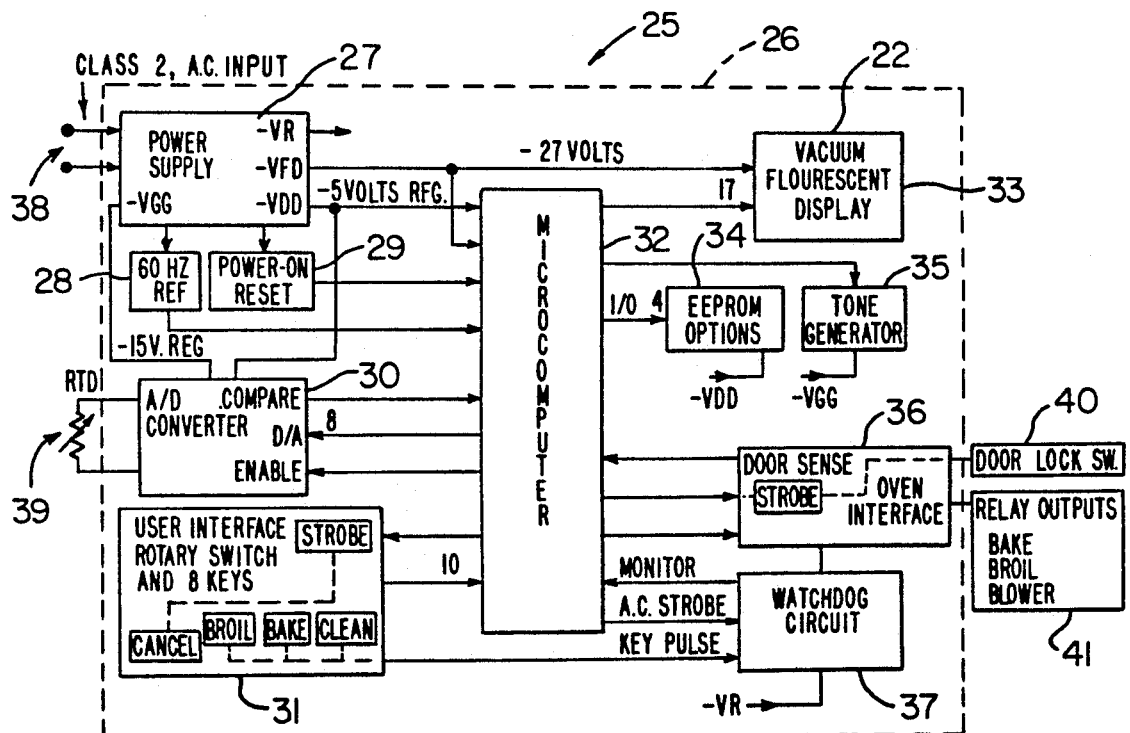
FIG. 2 is a block diagram illustrating the various circuit sections of the electrical circuit means of the control unit of FIG. 1 in block form and illustrates how the electrical circuit means is interconnected to external components to operate the same.
Figure 4B:
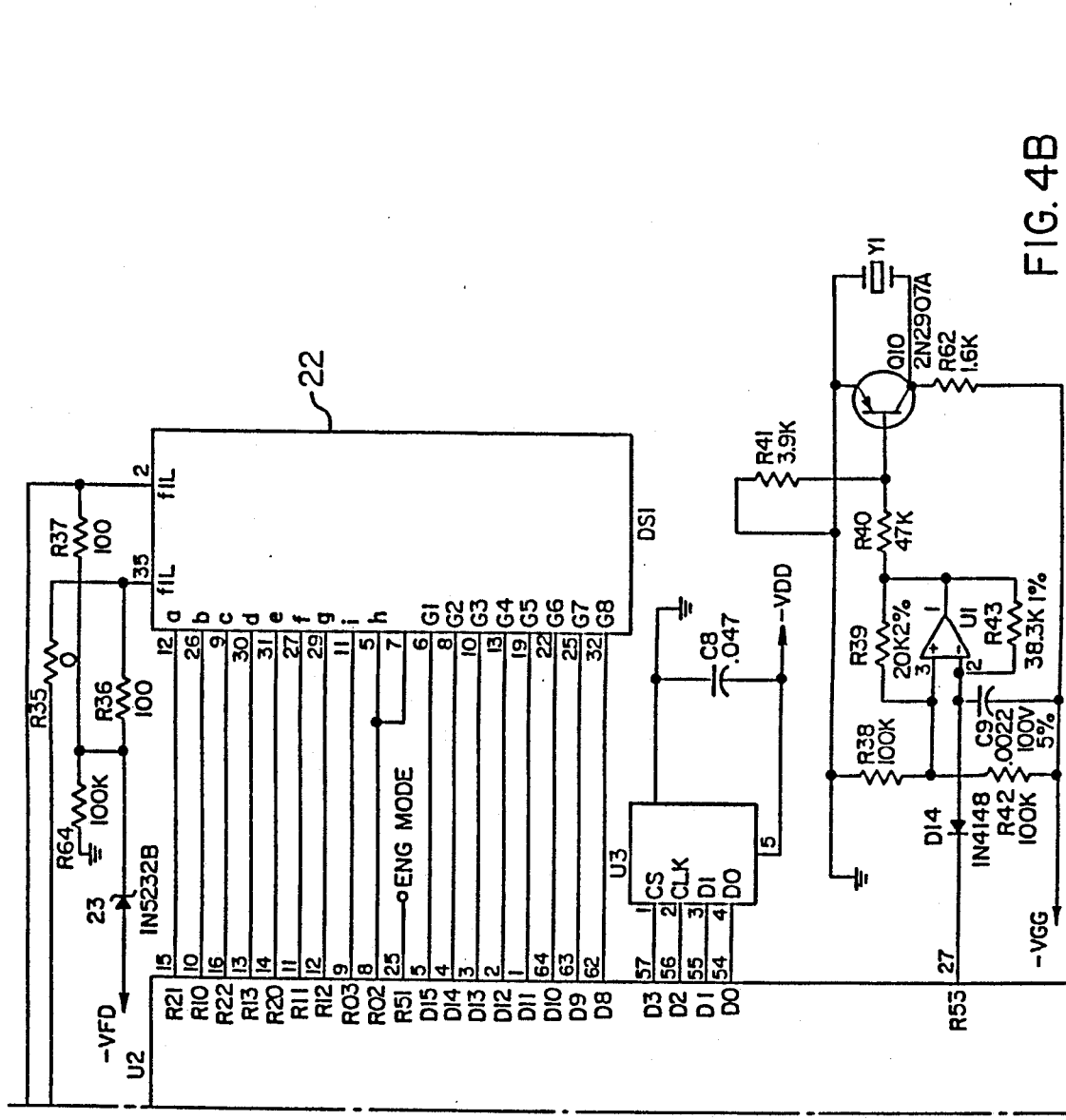
Figure 4C:
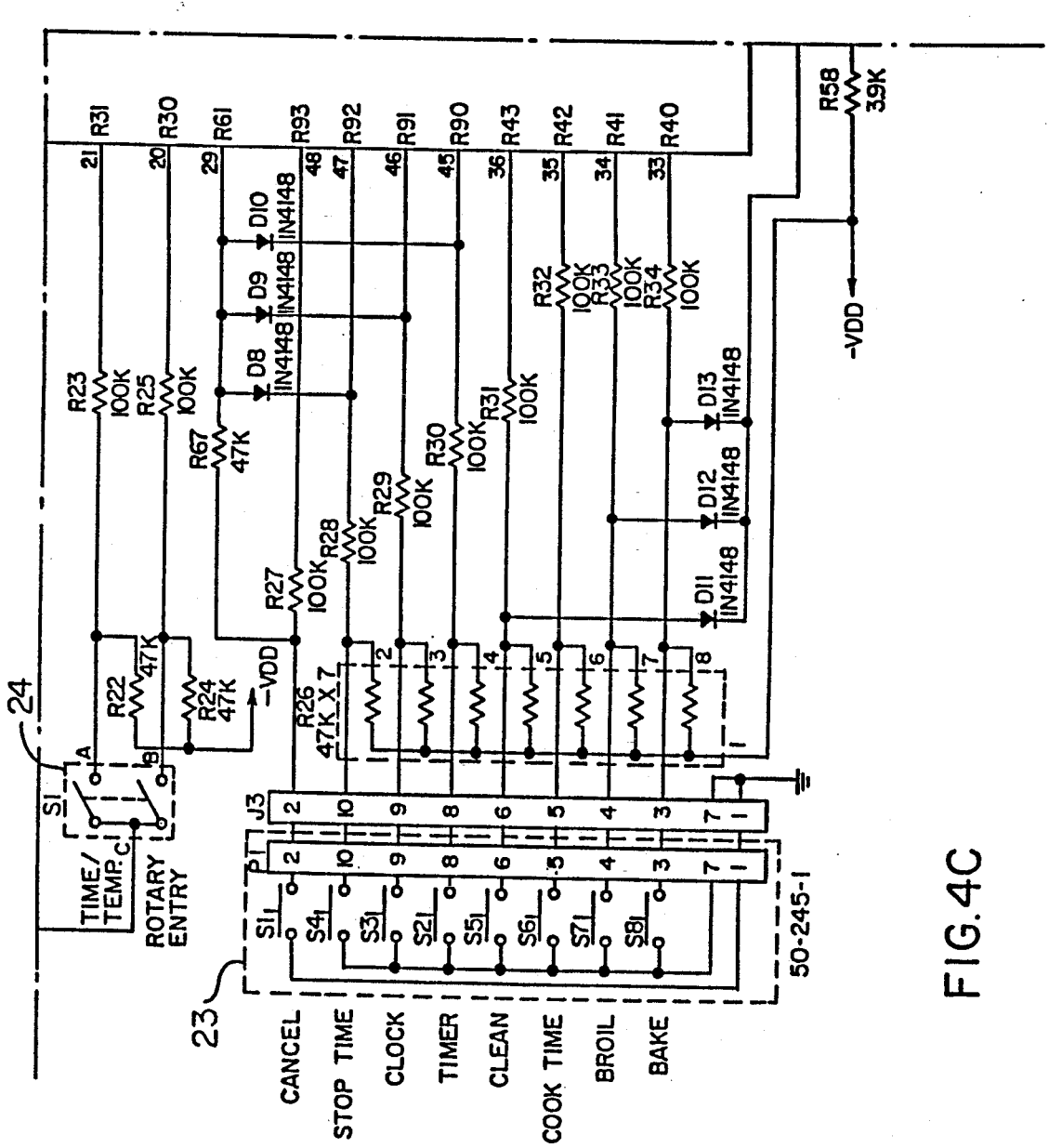
Figure 4D:
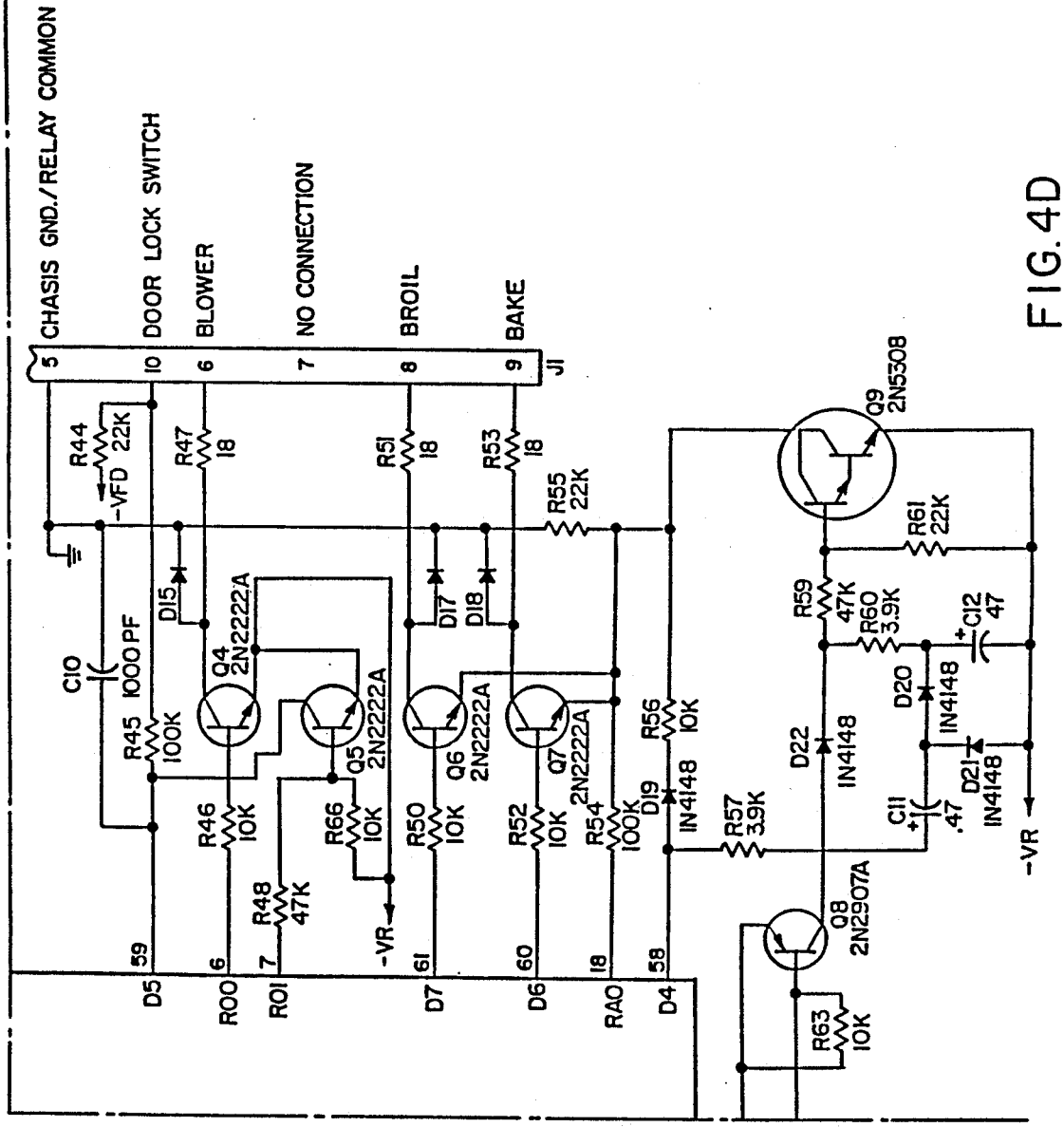

The control unit 20 has an electrical circuit means therein which is generally indicated by the reference numeral 25 in FIGS. 2 and 4, the circuit means 25 being schematically illustrated by the dashed block 26 in FIG. 2 and containing sections of the electrical circuitry 25 as blocks 27, 28, 29, 30, 31, 32, 33, 34, 35, 36 and 37.

The block 27 comprises the electrical power supply for the control unit 20 and is adapted to be interconnected to an external power supply 38, FIG. 2, which comprises a Class 2, A.C. input and which in one working embodiment of the invention is 21 VAC, 50/60 hz, the outputs of the power supply block 26 for the circuit 25 being −VR, −VFD, VDD and VGG.

The block 28 comprises a 60 hz reference generator to provide the real time reference signal utilized by the control unit 20 and the block 29 comprises a power on reset to provide a reset state for the control unit whenever insufficient voltage is available to properly power the control unit 20.

The block 30 is an A/D converter and is adapted to be interconnected to an external RTD temperature sensor 39 for the oven (not shown) of the cooking apparatus (not shown) using the control unit 20.

The block 31 is the user interface means of the circuitry 25 that contains the eight push buttons on keys S1-S8 and the rotary switch 24.

The block 32 comprises a microcomputer that is hereinafter referred to as U2 in this description and in FIG. 4 of the drawings, the microcomputer being conventional in the art and being programmed to function in a manner hereinafter set forth.

The block 33 comprises the display means 22.

The block 34 comprises a conventional EEPROM and is a sixteen by sixteen bit device that is hereinafter referred to as U3 in this description and in FIG. 4 of the drawings.

The block 35 comprises a free running oscillator U1 whose frequency is a nominal 2.45 KHZ and drives a piezoelectric speaker Y1.

The block 36 comprises an oven interface means that has three outputs and a software monitored input from an externally interconnected self-clean door lock mechanism 40, the outputs activating externally interconnected relays (not shown) which, in turn, respectively activate the oven bake element and oven broil element as well as a down draft fan (if required) that are schematically indicated by the external block 41 of FIG. 2.

The two outputs of the block 36 that control the heating elements must pass current through the block 37 prior to enabling the element relays, the block 37 comprising a watchdog circuit that supplies redundant control of the heating elements by requiring a mechanical key closure prior to allowing power to reach the relays that control the heating elements in a manner hereinafter set forth.

The power supply block 27 is of conventional construction as illustrated in FIG. 4A and provides the following voltages.

The −VFD supply is a source of approximately −27 volts D.C. It is unregulated and supplies the vacuum fluorescent display 22 plus the −15 volt regulator. Diodes D3 and D5 and capacitor C4 are the primary components, forming a half-wave, capacitive input circuit. Capacitor C2 provides a RFI/EMI decoupling function. The large, 1000 mfd. value of capacitor C4 is required because of the long power interruption withstand requirement placed on this design. Sufficient energy must be stored to allow continued microcomputer operation, without reset, for at least 4 seconds after power is removed. To improve this ability still further, diode D2 also couples energy from the 470 mfd capacitor C2 in the −VR supply in the event of a power dip. This has practical value only if the relay outputs are off at the time of power interruption. Due to the configuration of diodes D1-D5, the −VFD supply is independent of the −VR supply. The two supplies are charged from opposite phases of the incoming A.C. voltage. This minimizes voltage fluctuations as loads change and balances the load placed on the power transformer.

The −VR supply is of similar configuration to the −VFD supply. Its purpose is to provide power for external D.C. relays, having 24 VDC coils. The components comprising this circuit are diodes D1 and D4, capacitor C1 and the external Class 2 power transformer 38. It will provide approximately −24 VDC when loaded with 80 ma. of coil current from the relays. This supply is developed separate of the −VFD supply to provide failure isolation and from the logic supplies which are developed from −VFD.

The −VGG supply provides a source of low current, −15 volts DC, regulated. It consists of resistors R6 and R2, transistor Q1 and zenor diode Z1. Unregulated −27 VDC from the −VFD supply is applied to the collector of transistor Q1 through current limit resistor R6. The base of transistor Q1 is tied to the junction of resistor R2 and diode Z1, which form a voltage divider producing a stable 15.6 VDC derived from the −VFD supply. The circuits being powered by this supply become the emitter resistor for transistor Q1, whose current gain provides a stable source of voltage that is 0.6 VDC lower (due to the Vbe drop of transistor Q1) than the reference voltage provided by diode Z1. Hence, a source of −15 VDC which maintains its voltage under varying load conditions is created. The main purpose of this supply is to provide proper power and regulation for use by the A/D circuitry which decodes oven temperature. It is also used as a preregulator for the −VDD supply, which powers the microcomputer U2.

The −VDD supply works on the same principal as the −VGG supply. It consists of resistor R3, transistor Q2 and zenor diode Z2. Its input is the −VGG supply and its output is −5 VDC. This supply powers the microcomputer U2 and EEPROM U3. It is especially stable due to the input source already being a regulated voltage.

The 60 Hz reference generator circuit 28 provides the real time reference signal used by the microcomputer U2 to generate accurate Time of Day Clock, Timer and other functions requiring consistent real time response. It is basically an inverting, single transistor amplifier, driven to saturation by a signal derived from the AC power line. This signal is taken directly from the Class 2 power source 38. It is conditioned through a low pass filter to prevent errors due to electrical noise on the AC line, before being applied to the base of transistor Q3. The filter consists of resistances R7 and R10, capacitor C5 and resistor R11. Transistor Q3 inverts and squares up the incoming sinusoidal waveform before applying the resulting square wave signal to pin 23 of the microcomputer U2. Resistor R13 is merely a pull-down resistor allowing the collector of transistor Q3 to swing between 0 and −5 V. Capacitor C13's function is to decouple radiated RFI, which could upset timing accuracy if not suppressed. Since failure of this circuit would result in the microcomputer U2 losing its capability to keep accurate time, it is supervised in software. Inhibiting this signal will result in the error code −F6− being displayed, and an audible alarm to sound, with all outputs shut down.

The power on reset functional block 29 provides a single pulse that is applied to pin 49 of the microcomputer U2 which is the reset input of the microcomputer U2. Its function is to provide monitoring of the −VFD supply and to place the microcomputer U2 in a reset state whenever insufficient voltage is available to properly power the device. It does this by driving pin number 49 high under insufficient voltage conditions, which is the reset state of this input. Resistors R1 and R5 form a voltage divider placing 27.7% of the instantaneous −VFD supply voltage on pin 12 of op amp U1. The other input to pin 13 of the op amp U2 is tied to the −VDD (−5 V.) supply, through impedance matching resistor R5. After power is applied to the control, the −VFD supply voltage rises at a rate dependent on the value of capacitor C4 and the characteristic impedance of the external power transformer 38. The output at pin 14 of U1 is in a high state initially because the divider action on its (+) input slows the rate of voltage rise compared to its (−) input. Upon reaching approximately 18 VDC, the voltage at the (+) input of pin 12 of the op amp U1 becomes more negative than the (−) input pin 13 which is tied to the −5 volt supply This causes the output pin 14 of the op amp U1 to switch to a low output condition. Diode D6 provides a latching action by pulling the (+) input greatly negative once the output has switched to a low state. This latching action prevents oscillation of the circuit at borderline trigger voltages. It also provides hysterisis action which avoids resetting the microcomputer U2 until just before the −5 volt supply falls out of regulation. This delays the decision to reset from a powered state as long as possible to allow the 4 second power loss withstand capability. Resistors R9 and D23 form a level shift circuit to protect the 5 volt reset input of the microcomputer U2 from the 15 volt output swing of the op amp U1. The resistor R4 is a pull-up resistor for the op amp U1 which assures proper logic levels and initial state of U1's output.

The temperature sensing circuit 30 of this invention improves upon the prior known circuits in several ways.

For example, a ramping voltage, rather than a constant current, is used to excite the sensor 39. This creates a less costly, yet accurate arrangement, requiring fewer and less critical components. The circuit 30 is also insensitive to power supply variations, allowing that circuitry to also be less complex. Also, through software logic, circuit faults that could produce temperature sensing errors of a troublesome magnitude may be detected and acted upon by the microcomputer U2 of this invention. When used as a temperature controller, the circuit 30 may shut down a heat source and sound an alarm when the device's ability to control temperature accurately is jeopardized. In addition, the dynamic range of the circuit is expanded due to the method of interface from the D/A converter 30 to the sensor 39. All counts of the 256 bit A/D are usable because the circuit 30 avoids applying voltages to the op amp U1 that would exceed its common mode input range. This is achieved without expensive power supply additions. Calibration is also performed without moving parts or potentiometers and the method is electronic.

The A/D circuit 30 works in conjunction with the microcomputer U2 to decode the sensor resistance reading into a digital format, which may then be processed using digital techniques to sense temperature. The A/D function is actually achieved by a D/A technique first, which is then decoded as an A/D result.

Figure 5:
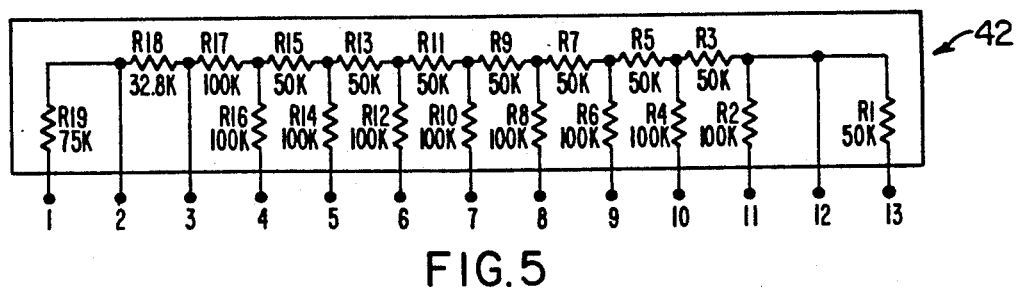
FIG. 5 is a fragmentary view of part of the internal circuit means of a custom network that is illustrated in FIG. 4A and forms of the main circuit means of the control unit of FIG. 1.

As illustrated in FIG. 4, the D/A function is produced by the microcomputer U2 and a Custom Network R18. Two, four bit microcomputer ports, R7 and R8 of the network R18 and pins 37–44 of the microcomputer U2 are utilized in tandem as an eight bit, binary up/down counter, which drive a standard eight bit, R/2R resistance ladder network 42 (FIG. 5) contained within network R18. Pin 3 of network R18 is the terminating pin for the ladder network and pin 12 of network R18 is the analogue output pin. Pins 4–11 of network R18 are the eight input terminals to the ladder network, with pin 4 of the network R18 being the least significant bit (LSB) and pin 11 of network R18 being the most significant bit (MSB).

Power to activate the A/D circuit 30 is derived from the −5 volt supply −VDD. Pin 32 of the microcomputer U2 provides the positive (+) connection and pin 53 of the microcomputer U2 and pin 3 of the network R18 provide the negative (−) connections. The pins 37–44 of the microcomputer U2 will either apply a logic 1 (0 VDC) or logic 0 (−5 VDC) connection to the eight input pins 4–11 of the network R18. The pattern of 1's and 0's that are applied to the inputs of the network R18 are in the form of either a binary up count or binary down count. The result of this action appears at the output pin 12 of the network R18. Starting at binary 00000000, the voltage at pin 12 of the network R18 will be equal to the voltage of the −VDD supply. As the output pins 37–44 of the microcomputer U2 count up, a positive going staircase waveform appears at pin 12 of the network R18. With each count the voltage pin 12 of the network R18 increases by −VDD/256. With a count of 11111111, the voltage at the pin 12 of the network R18 is maximum. This value is 255/256 of the −VDD supply. When a binary down count is applied, the sequence is reversed and the waveform at pin 12 of the network R18 becomes a negative going staircase waveform.

The output waveform of pin 12 of the network R18, 12 is conditioned by operational amplifier U1 and applied to the RTD sensor 39 through series resistors R65, R20 and R19, and returned to circuit common through resistor R15. This results in a varying voltage being applied to the sensor 39 rather than the conventional constant current excitation.

The RTD censor 39 is of such construction that the electrical resistance of the sensor 39 increases as the temperature of the sensor 39 increases, giving it a positive temperature coefficient. This resistance change is very predictable and repeatable. Because of this, the voltage across the sensor 39 is very predictable with a known current flowing through the sensor 39. By exciting the sensor 39 with a known, accurate current, a known accurate voltage is developed across the sensor 39. This known, accurate voltage may be interpreted, using digital techniques, into a temperature indication. The reverse is also true, and forms the principle of operation of this circuit arrangement 30. When a known voltage is applied, the current through the sensor 39 will be of a known amount at any given temperature. In this case, a known proportional voltage source, is produced by the microcomputer U2 and the Custom Circuit R18, and applied to the RTD sensor 39. This voltage is increased until a predetermined proportional current level is achieved through the sensor 39. The voltage required to achieve this pre-determined current is directly proportional to the temperature of the RTD sensor 39. The temperature-resistance curve of the RTD sensor 39 is such that for every unit change of temperature, there is a very nearly constant change of voltage at a given current level. By proper choice of current and voltage levels, a single unit increase in temperature will require exactly one additional binary count of voltage to achieve the same predetermined current level through the sensor 39.

The circuit arrangement 30 shown is set up to decode degrees Fahrenheit in 5° F. increments from −255° F. to +1055° F. The best choice of values for the circuit components are dictated by the application requirements. In addition, to cover this exceptionally wide range, software decoding must compensate for whatever tracking error does exist between the sensor 39 and the D/A circuitry 30 if satisfactory results are to be achieved. In most applications, only a portion of this range is required, so satisfactory results are obtained over a limited range without software compensation.

Basic circuit function consists of six phases which comprise a conversion cycle, the six phases being: Circuit Enable; Up Count To Compare, Temperature Display and Controller Action; Down Count To Discompare; Error Check and Circuit Disable.

PHASE 1 CIRCUIT ENABLE

At the start of a conversion cycle, the circuit enable line 28 of the microcomputer U2 is changed from a logic 1 to a logic 0, establishing a virtual ground equal to the −VDD supply at pin 11 of the op amp U1. The pull-down resistor R21 assures that pin 5 of the op amp U1 is exactly at −VDD potential. This mandates that the (−) input at pin 6 of the op amp U1 is exactly at −VDD potential. This mandates that the (−) input at pin 6 of the op amp U1 also be at virtual ground potential as controlled by the output pin 7 of the op amp U1 through the 50K ohms feedback resistor R1 (FIG. 5) contained in the Custom Network R18 from pins 11 to 12 thereof. Since the microcomputer U2 applies a binary count of 00000000 to pins 4–11 of the network R18 at the start of this cycle, analogue output pin 12 of the network R18 is also at −VDD potential. No correction voltage from the output pin 7 of the op amp U1 is required to establish virtual ground potential at pin 6 of the op amp U1. Therefore, the output pin 7 of the op amp U1 also establishes itself at −VDD potential. This in turn applies −VDD voltage potential to the series circuit of resistors R65, R20, R19, connector J2, interconnecting wires, the RTD sensor 39 and resistor R15. The resulting current causes a voltage to develop across the resistor R15.

Resistor R15 is a precision ±0.5% metal film resistor with a low temperature coefficient, indicating a stable resistance as the ambient temperature changes. The voltage developed across this resistor R15 is representative of the current flowing through it with great precision, and is monitored by the (−) input pin 9 of the operational amplifier U2, after passing through an impedance matching resistor R16. This voltage is compared against a proportional reference voltage derived from the −VDD supply by resistor divider network R19/R18 (FIG. 5) contained within the Custom Network R18, and brought out on pin 2 of the network R18 which is connected to pin 10 of the op amp U1. This voltage is 69.57%, ±0.5% of the −VDD supply, which equals −3.4785 volts when the −VDD supply is a nominal −5.0 VDC. The voltage will vary as the −5.0 VDC varies, but in proportion to the D/A converter analogue output pin 12 of network R18 which also derives power from the −VDD supply. This fact allows this circuit arrangement 30 to retain accuracy without the need for expensive, highly stable power sources.

The reference voltage will always be more negative than the voltage developed across resistor R15 at this point in the conversion cycle. Because of this, the output at pin 14 of the op amp U1 will also be in a logic low state due to its (+) input being more negative than its (−) input. Because operating power for the pin 11 of the operational amplifier U1 is derived from the −VGG supply, the output will be at nearly −VGG potential, which is a nominal −15 VDC. This voltage reverse biases the series circuit of resistor R49 and diode D16 which is a special low reverse leakage diode attached to input pin 10 of the op amp U1. No effect is created at the input as a result of pin 8 of the op amp U1 being in the low state.

The initial conditions of the conversion cycle are therefore established as: Binary Count on pins 37–44 of the microcomputer U2 equals 00000000; Analogue output from pin 12 of network R18 equals −VDD; Output of pin 7 of op amp U1 equals −VDD; Voltage across resistance R15 is more positive than the reference voltage at pin 2 of the network R18; and Output of pin 8 of the Comparator op amp U1 is logic 0.

PHASE 2 UP COUNT TO COMPARE

The current flowing through resistor R15 is dependent on two major factors. First the resistance of the RTD sensor 39, which varies with the temperature of the sensor 39. Secondly, the voltage appearing at pin 7 of the op amp U1. Resistors R19, R20 and R65 also affect the voltage developed across resistor R15, but the effect is constant, with their intended function being unrelated to the basic function of this circuit. This will be discussed later.

With the circuit initialized as described in Phase 1, the microcomputer U2 begins to count up in binary and toggle the eight output lines or pins 37–44 thereof accordingly. With each count, the voltage at analogue output pin 12 of the network R18 attempts to raise by an amount equal to −VDD/256 with each step. Due to the arrangement of the operational amplifier U1, and the feedback resistor R1 (FIG. 5) internal to the network R18, this attempt to raise the voltage of pin 12 of the network R18 also causes an equal but opposite reaction from pin 7 of the op amp U1 with the net effect being no change of voltage at pin 12 of the network R18. Instead, the mirror image of this voltage appears at pin 7 of the op amp U1.

The characteristic output impedance of any R/2R network such as contained in the network R18 is equal to R. With the resistance R1 internal to the network R18 being chosen to equal the R value, in this case 50K ohms, the op amp U1 is configured as a unit gain, inverting amplifier, referenced to −VDD. The output impedance of the network forms the input impedance for pin 6 of the op amp U1 and the resistor R1, within the network R18, forms the feedback resistance. Because all resistors of this circuit are made from the same thick film ink, the ratio of input to feedback resistance remains in the same ratio, even though the absolute values will change with time and temperature. Because of this, the long term gain accuracy of this device is anticipated as being very stable with no further adjustments required.

The net effect of this arrangement is that for every count up by the microcomputer U2, an equal and opposite analogue voltage appears at pin 7 of the op amp that starts at a voltage equal to −VDD and decreases in the negative direction. At a binary input to pins 4–11 of the network R18 of 11111111, the voltage at pin 7 of the op amp U1 will be −VDD +(255/256(−VDD)). The full range of voltages at pin 7 of the op amp is nominally −5 to −5.98 VDC.

It is important to note that because the circuit maintains the analogue output pin 12 of the network R18 at virtual ground, the common mode input range of the op amp U1 is never violated, even at very high outputs from pin 12 of the network R18 that would normally exceed the acceptable input range of the op amp U1. In similar circuits not utilizing this arrangement, the usable range of the circuit would only be about 70% of the available output from pin 12 of the network R18.

As the voltage at pin 7 of the op amp U1 decreases (absolute value increases), an ever increasing amount of current begins to flow through the resistors R65, R20 and R19, the RTD, censor 39 and resistor R15. As a result, the voltage across the resistor R15 becomes more and more negative with each up count by the microcomputer U2. At some point, the voltage developed across resistor R15 will become more negative than the reference voltage at pin 2 of the network R18. It is important to note that because of the stable reference, this point will always be reached at the same current level through the resistor R15 and the probe circuit. When this happens, the output pin 8 of the op amp U1 will rapidly switch from a logic 0 to a logic 1 state, with the pull-up resistor R17 assuring proper logic levels. In doing so, the feedback network of diode D16 and resistor R49 becomes forward biased, causing a small amount of positive current to flow into the reference circuit of pin 2 of the network R18. This small current causes the reference voltage to shift a controlled amount in the positive direction, effectively making the voltage at resistor R15 appear to become even more negative with respect to the reference voltage. This controlled shift speeds the transition of pin 8 of the op amp U1 from the logic low to the logic high state. The shift in the reference is also used to error check the hardware and will be described later.

The output pin 8 of the op amp U1 is coupled to the input pin 24 of the microcomputer U2 through buffer resistor R14. This input senses the instant at which the transition of pin 8 of the op amp U1 from logic 0 to 1 occurs. When this happens, the upward binary count of pins 37–44 of the microcomputer U2 is terminated under software control. This count is stored in a temporary memory register for later use in the conversion cycle. In this circuit, the count at the instant of transition will be unique with every 5° F. difference of the RTD temperature sensor 39 and may be digitally processed. As the temperature, and therefore the resistance, of the sensor 39 increases, a higher binary count will be required to cause the same current to flow through resistor R15. The circuit function is based on ramping to a predetermined current through the sensor 39, decoding the binary count required to produce this current, and then deriving a temperature indication based on a software algorithm specific to the application. A higher binary number will equal a higher temperature indication. Choice of circuit values will determine the exact relationship.

PHASE 3 TEMPERATURE DISPLAY AND CONTROLLER ACTION

Once the unique binary count is obtained from phase 2 of the cycle, a temperature indication is derived by the microcomputer U2 and used by the microcomputer U2 to place a visual indication in display 22, to control a heat source, to sound an alarm, or to do whatever else the application requires. Before acting upon a single temperature reading, the software of the microcomputer U2 may also digitally filter the input before further processing. Such software techniques will allow for better performance in electrically noisy environments or produce an average reading rom a rapidly changing sensor temperature.

PHASE 4 DOWN COUNT TO DISCOMPARE

After the software algorithm extracts the binary number required to achieve a logic high at pin 8 of the op amp U1 and decodes the temperature, a second comparison is made. This second comparison is used in phase 5 to determine if a hardware fault exists.

Rather than starting from a binary 00000000 and counting up in binary, the microcomputer U2 starts at a binary 11111111 and counts down for the second reading. This down count is terminated when pin 8 of the op amp U1 returns to a logic low state as sensed by the input pin 24 of the microcomputer U2. The binary count required to produce a logic 0 at pin 8 of the op amp U1 is compared to the count obtained in phase 2, which required a logic 1. If the circuitry is functioning normally, the two counts should compare within a range determined by the feedback circuit of the op amp U1, diode D16 and resistor R49, and the desired sensitivity level of error checking that the application requires. The down count value will always be a lower binary number than the up count value if the circuit is working normally. The amount of inherent difference is determined by the value of the resistor R49 and the stability of the incoming analogue voltage from the sensor 39. These two readings must be made within a very short time of one another to avoid actual changes in the sensor output from affecting this relationship. In other words, the sensor 39 must appear to be of a constant temperature between obtaining the up and down count values. The application will dictate the timings required.

PHASE 5 ERROR CHECKING

In the control unit 20 it was desired to cease operation if a hardware error was present that produced more than a 50° F. shift in temperature regulation from the intended set point. The error checking was set as follows.

The resistor R49 was chosen to produce a nominal 3 bit difference between the up count and down count values. This equates to a 15° difference in this application.

The software of the microcomputer U2 is programmed such that the down count is subtracted from the up count and the result stored in temporary storage. This number will typically be a 3 or a 4. This number is passed through an adjustable software filter, with the adjustments stored in the non-volatile memory or EEPROM U3. Only numbers that are in the range of 2-9 are allowed to pass. If the difference does not fall into this range, a hardware fault is indicated, and action is taken to disconnect power to the heat or cooling source as dictated by the application.

In addition to this fault detection scheme, two other conditions must be met. In particular, the sensor 39 must not produce a logic high at pin 8 of the op amp U1 when the binary input to the network R18 is 00000000. If it does, the sensor 39 is determined to be shorted and not functional. Operation is ceased. Also, the sensor 39 must produce a logic 1 on the output pin 8 of the op amp U1 prior to the microcomputer U2 outputing a value of 11111111 to the network R18. If it does not, the sensor 39 is determined to be open and not functional. Operation is ceased.

The most frequest failure modes of the sensor 39 will be detected by this scheme, whereas the most frequent failures of the A/D converter 30 are detected by the up/down count comparison routine.

PHASE 6 CIRCUIT DISABLE

The cycle concludes after completing the previous 5 phases. The cycle terminates by removing power to the sensor 39 to minimize self-heating effects caused by power dissipation in the sensor 39 itself during the excitation process. This is achieved by returning the enable line 28,R60 of the microcomputer U2 to a logic high state, which also forces the pin 5 of the op amp to a more positive value. The output pin 7 of the op amp is also forced high, essentially removing the excitation voltage to the series circuit of resistors R65, R20 and R19, the RTD sensor 69 and resistor R15.

The duty cycle of on time to off time of the probe circuit is maintained at a value suitable to the sensor 39 and the application in this manner.

The function of the resistors R19, R20 and R65 is three-fold. First, they provide a measure of current limiting in the event the RTD sensor 39 is somehow shorted, for protection of output 7 of the op amp U1. Secondly they form a low pass filter in conjunction with the capacitor C6, which buffers against high frequency EMI/RFI disruptions. Third, they provide a means to intentionally offset the probe value without programming changes, by providing either a series resistance with the RTD sensor 39 or a parallel resistance across the resistor R19, intentional offset adjustments may be made. The value of the resistors is such that if any single resistor shorts, the effect on the temperature accuracy will be less than 50° F.

Calibration is done without potentiometers. The gain of the circuit requires no adjustment due to the ratiometric nature of the circuit and laser trimming of the resistors in the network R18 to a close ratio match. The primary adjustments are of an offset nature between the sensor circuit and the A/D circuit.

To calibrate, a special test mode contained in the microcomputer U2, not accessible to the end user, is accessed. A precision resistor having a resistance value equal to the desired calibration temperature of the RTD sensor 39 replaces the RTD sensor 39 in the circuit. The test operator then instructs the microcomputer U2 through a keyboard, or other entry scheme to accept the value of the precision resistor as a stated temperature. The microcomputer U2 performs the up count portion of the conversion cycle, obtains the binary mumber that results, and permanently stores in the non-volatile memory or EEPROM U3 the result. All temperature measurements after this point will be shifted such that no error exists at the calibration point. Typical accuracy of ±3° F. are achievable over the range of 150° F., without further software or hardware compensation. If greater accuracy is desired, multiple calibration points are possible.

The user interface circuit module or block 31 contains the rotary switch 24 and eight momentary contact push buttons S1-S8. Appliance operation is programmed by the user through these switches. The rotary switch 24 generates a signal that is fed through resistors R23 and R25 into the respective input pins 21 and 20 of the microcomputer U2. Resistors R22 and R24 are pull-down resistors to −VDD so that 5 volt logic signals are generated. The microcomputer software decodes which direction the rotary switch 24 is being turned and increments or decrements the displayed reading in display 22 accordingly and in the manner fully set forth in the aforementioned patents.

The eight momentary contact switches S1-S8 are used to select which function the rotary switch 24 will program. Resistors R27 through R34 are buffering/coupling resistors to the microcomputer U2 from the switches S1-S8. Sip resistor R26 provides a pull down to −VDD for each switch S1-S8.

The function keys S8, S7 and S5 that result in oven operation Bake, Broil and Clean, also feed another circuit through respective isolation diodes D13, D12 and D11. They will be hereinafter discussed in the section on the watchdog circuit 37.

One unique key is the Cancel key S1. Because this design relies on this switch S1 to provide a reliable, single button cancel of oven operation, extra software monitoring of this key is provided. A strobe signal from pin 29 of the microcomputer U2 is applied to this key S1 through a buffering resistor R67. If the Cancel key S1 shorts, resistor R27 opens, the micro input or the strobe line fails, the AC signal normally present at pin 48 of the microcomputer U2 will not be detectable by the software of the microcomputer U2. The result will be a failure alarm and appliance shutdown.

The remaining keys S2-S8 are monitored in the software of the microcomputer U2 for short circuit conditions that could cause unattended appliance operation. Any key S2-S8 held down for more than 8 seconds results in an error alarm similar to the Cancel key S1.

Diodes D8, D9, D10 are option diodes. When they are installed, a different controller option will be selected in software by the signal that is coupled from the Cancel key strobe line to other microcomputer inputs. These options are installed at the time of manufacture and are not user accessible.

The vacuum fluorescent display circuit 33 is the means by which controller operating information is visually displayed by the microcomputer U2. It consists of the display 22, resistors R35, R36, R37 and R64, and diode Z3, in addition to the microcomputer U2.

The resistors R35, R36, R37 and R64 and zener diode Z3 are used to properly bias the filament of the display 22. The content of displayed information depends on the microcomputer U2 which uses a conventional multiplexing scheme to drive the 8 grid by 9 segment display 22.

The EEPROM circuit 34 consists of the microcomputer U2, a decoupling capacitor C8 and the EEPROM U3 which is a 16 by 16 bit device. It provides a means of storing various options that modify the standard, default feature set of the program stored in the microcomputer U2. The control unit 20 will operate without this device U3 installed according to the standard feature set. By installing the EEPROM U3, all aspects of controller operation that are desirable to be adjustable, may be customized for specific needs. In the area of temperature regulation, these adjustments are limited to ±35° F. each. In addition, upon power loss, the time of day is saved, allowing the control unit 20 to power back up with the time of power failure in the display. This mimics mechanical clock operation.

The pin 1 of the EEPROM U3 is the chip select line thereof. A synchronous clock signal generated by the microcomputer U2 is fed into pin 2 of the EEPROM U3. The pin 3 of the EEPROM U3 is the serial communication line for communicating to the device U3. The pin 4 of the EEPROM U3 is the data out serial port by which information is extracted from the EEPROM U3.

If the microcomputer U2 reads a consecutive string of all logic 1's or 0's when reading the data out port, pin 4 of the EEPROM U3, the software of the microcomputer U2 assumes no options are required and the control unit 20 operates according to a default set of operating parameters. In this manner, the failure of the EEPROM U3 does not radically affect appliance operation from a safety standpoint.

Even though the EEPROM U3 is capable of non-powered data retention for a minimum of 10 years without refresh, an added precaution is taken through software to assure that the initial options remain unchanged for the life of the appliance. During the cool down period following a clean cycle, the microcomputer U2 first reads and then stores in RAM, all of the option information. It then performs a refresh cycle by writing the information just obtained, back into the EEPROM U3. This action is similar to charging a rechargeable battery. In a normal usage situation, this will assure that the EEPROM U3 will not suffer data loss with time. It is expected that a clean cycle will occur at least a few times per year. Data retention in this case need only be a few months rather than 15 years, which is a typical oven's lifespan.

Other than time of day clock, and the user preference offset feature (which electronically simulates the movable pointer on a conventional thermostat knob) the control unit 20 has no provision to change information stored in the EEPROM U3 without the aid of an external programming device.

The tone generator circuit block 35 contains a free running oscillator U1 whose frequency is a nominal 2.45 KHZ. The oscillator U1 is fed to an amplification/buffering stage which directly drives a piezo-electric speaker Y1.

In particular, resistors R38 and R42 form a voltage divider supplying 50% of the −VGG voltage to the (+) input pin 3 of the op amp U1. This 50% value is offset depending on the state of the op amp's output. When the output is at a high level this 50% value is shifted by current through a resistor R39 to about 20% of the supply voltage. When low, this value is shifted to about 85% of the supply voltage.

On the (−) input pin 2 of the op amp U1, a capacitor C9, a resistor R43 and a diode D14 are connected. The other side of the capacitor C9 connects to circuit common and the other side of the resistor R43 connects to the op amp's output pin 1. When the output pin 1 of the op amp U1 is high, current is sourced through the resistor R43 to the capacitor C9, which charges at a rate determined by the RC time constant of resistor R43 and capacitor C9. When the output at pin 1 of the op amp U1 is low, the capacitor C9 is discharged through resistor R43. Oscillation occurs because as soon as the difference in voltage between capacitor C9's charge and the power supply is less than the 20% value mentioned earlier for the (+) input at pin 3 of the op amp U1, the op amp output pin 1 changes to a low state which also changes the (+) input voltage to the 85% of supply condition. Now, capacitor C9 starts to discharge. When it reaches less than 15% of the supply voltage, it causes the output to swing high again. An osciallation results.

The microcomputer U2 controls the tone duration by inhibiting oscillation. Pin 27 of the microcomputer U2 is coupled through diode D14 to the oscillator U1. Since this output of the microcomputer U2 is a 5 volt, CMOS output, the diode D14 performs two functions. First, it buffers the output from the −15 volt swings of the op amp osscillator U1. Secondly, it inhibits the charging of the capacitor C9 when the microcomputer's output 27 is at a logic low. This stops the charging of the capacitor C9 with about 10 volts across it, which falls short of the upper voltage limit required to sustain oscillation. The op amp's output pin 1 stays in a high state until the microcomputer's output pin 27 is set to a logic high, allowing the capacitor C9 to charge further and restore oscillation.

The resistors R40, R41 and R62, transistor Q10, and piezo speaker Y1 form the remainder of the tone generator circuit 35. The resistor R40 couples the output of the oscillator op amp U1 to the base of transistor Q10 which is a PNP transistor. This transistor Q10 provides current gain and buffering from the oscillator U1 to the piezo speaker Y1. Transistor Q10 merely acts as a switch, allowing the speaker Y1 to charge through resistor R62 and then discharging it from collector to emitter when the transistor Q10 is biased on. The resistor R41, the base to emitter resistor, is intended to desensitize the circuit 35 slightly to prevent low level crosstalk from other circuits causing the speaker Y1 to buzz.

The oven interface block 31 comprises three outputs and a software safety monitored input from the self clean door lock mechanism. The outputs are simple transistor drivers which activate external relays, which in turn, activate the oven bake and broil elements, plus a down draft fan if required. The two outputs controlling the heating elements must pass current through the watchdog circuit 37 prior to relay enabling.

In particular, the pin 59 of the microcomputer U2 is the door lock status input. Because this input determines whether or not a clean cycle may start, it was determined that component failures of the input circuit, or the input itself, must not allow a clean cycle if the oven door is unlocked. To achieve this, a technique similar to the cancel key monitor was used. An A.C. signal, generated at pin 7 of the microcomputer U2 and coupled to the door input pin 10 of strap J1 via transistor circuit R48, R66, and Q5, must be detected during clean operation. If not, clean operation is not allowed. The logic of this input is that a continuous low reading is a non clean mode and the limits of oven temperature are set accordingly. A clean mode requires alternating high and low readings to remain valid.

From a failure analysis standpoint, substantially all failures of this circuit 31 will result in shut down of the clean cycle. The remaining components in this circuit, resistors R44 and R45, and capacitor C10, must also be functional for the clean mode to be available. An external switch (not shown) is used to sense the position of the door lock mechanism.

The transistor Q4, resistors R46 and R47, and diode D15 form the blower output circuit. This is a conventional inverting switching amplifier arrangement. When the microcomputer pin 6 goes to a logic high, the transistor Q4 switches power from the −VR supply into an external relay coil (not shown). The other side of this coil is attached to circuit common to complete the circuit. Diode D15 protects the transistor Q4 from the inductive kick-back of the relay coil at turn off. The resistor R47 provides a measure of current limiting to protect the transistor Q4 against damage from abusive service techniques that may involve shorting across activated relay coils with a screwdriver to test the relay.

Transistor circuits Q6 and Q7 are the outputs for the respective Broil and Bake element relays (not shown). The arrangement is the same as for the blower circuit with one major exception. Since any failure of these circuits in the "on" condition would result in uncontrolled oven heating, redundant control of these drivers Q6 and Q7 is provided. The emitters of these transistors Q7 and Q7 attach to another switching device before a complete circuit to the −VR supply can be supplied to the relays controlling the heating elements. The redundant switching device is a transistor Q9 and is in the watchdog circuit 37 which is monitored through software, and provides turn off of these outputs at the limit points of 650° F. in bake, and 950° F. in clean as sensed by the oven probe.

The heart of the safety logic is contained in the watchdog circuit 37. Its purpose is to supply redundant control of the heating elements by requiring a mechanical key closure, S5, S7 or S8, prior to allowing power to reach the relays that control the heating elements. Once a cooking cycle has been initiated, an AC "keep alive" signal from the microcomputer U2 is required to sustain cooking. This A.C. signal is only generated if the microcomputer U2 is functioning sufficiently to regulate the oven temperature. In addition, the watchdog hardware is monitored through software of the microcomputer U2 to assure that the circuit 37 is functioning properly before allowing a heating mode to occur. This monitoring is continuous, and will result in a failure alarm should a fault be detected. Any single component fault of this circuit will result in a safe shut down, with the user being required to repair the fault prior to restoring use of the oven.

The Darlington transistor Q9 is the redundant controlling element in series with the bake and broil relay driver transistors Q6 and Q7. It must be biased on prior to either of these relays receiving power. In order to turn transistor Q9 on, the following sequence must occur.

First, a function key (Bake S8, Broil S7, or Clean S5) must be pressed in the User Interface circuit 31 that is attached through isolation diodes D11-D13 to the emitter of a level shift transistor QS. This turns on transistor QS, whose base is tied to −VDD through resistor R58. When the transistor Q8 is turned on, current flows from circuit common through the series path of the key S5, S7 or S8 being pressed, the diode D11, D12 or D13 of that key, the emitter-collector junctions of transistor QS, through an isolation diode D22, and into the branch circuit at the junction of resistors R59 and R60. Here, the current splits two ways, one path charging capacitor C12 from the −VR supply, and the other path causing sufficient current to flow into the base-emitter junction of transistor Q9 and resistor R61 to cause transistor Q9 to switch on in a saturated mode from collector to emitter. The collector of transistor Q9, which is connected to the emitters of the Bake and Broil driver elements Q7 and Q6 is now allowing current from the −VR supply to reach these drivers Q7 and Q6. This in effect "enables" the drivers Q6 and Q6. This "enabling" does not turn relays on until the drivers Q7 and Q6 are also instructed to do so by the microcomputer U2 which occurs later in the sequence.

Secondly, the microcomputer U2 must recognize that a key S5, S7 or S8 has been pressed in the User Interface circuit 31. Due to software debounce, the function key S5, S7 or S8 must be held down long enough for the capacitor C12 to receive an adequate charge to keep transistor Q9 "on" upon relase of the key S5, S7 or S8. If it is not held long enough, the microcomputer U2 simply ignores the key press and transistor Q9 turns off because the capacitor C12 discharges.

Assuming the key S5, S7 or S8 has been properly pressed, the microcomputer U2 will decode it as an oven operating function and start its output pin 58 toggling at about a 120 HZ rate. This signal is AC coupled through capacitor C11 and into the junction of diodes D20 and D21.

Since the output pin 58 of the microcomputer U2 is configured in the microcomputer U2 to be only able to source current to circuit common, capacitor C11 is able to provide a "keep alive" current flowing into capacitor C12, only if the transistor Q9 was on prior to the start of the AC signal. This is because a logic low on pin 58 of the microcomputer U2 is only available if there is an external pull down resistance provided. The circuit is configured such that transistor Q9 must be "on" prior to the pull down path being completed (through diode D19 and resistor R56).

The logic high state of the pin 58 of the microcomputer U2 causes current to flow through the series circuit of resistor R57, capacitor C11, diode D20 and capacitor C12. Due to the relative values of capacitor C9 (0.47 mfd.) and capacitor C12 (47 mfd.), a single charge cycle will not produce sufficient voltage across capacitor C12 to energize transistor Q9, unless several more closely spaced pulses occur. Since capacitor C12 was previously charged and transistor Q9 turned "on" (by a key press) a discharge path for capacitor C11 is provided when output pin 58 of the microcomputer U2 is set to a logic low state, through the path of resistor R57, diode D19, resistor R56, transistor Q9 collector-emitter, and back through diode D21. This discharge cycle allows current to flow from capacitor C11 and capacitor C12 on the next high transition of pin 58. A pumping action results that charges capacitor C12 to an equilibrium value of about 14 VDC as long as the 120 HZ signal remains present. This is sufficient to keep transistor Q9 energized. If output pin 58 stops toggling in either a high or low state, the pumping action of capacitor C11 into capacitor C12 stops, and capacitor C12 then discharges into resistors R60, R59 and R61, resulting in the transistor Q9 shutting off. This would require a key press before the transistor Q9 could once again be energized.

To insure that no hardware malfunctions have occurred that would cause the transistor Q9 to turn on without the proper key sequence and sustaining AC signal, a simple monitoring scheme is employed. Pin 18 of the microcomputer U2 is the watchdog monitor input. Through coupling resistor R54, pin 18 of the microcomputer U2 checks the state of the collector of the transistor Q9 on a continuous basis. An alarm sounds and the relay driver outputs are inhibited if the collector of the transistor Q9 is in the wrong state for the present operating mode of the control. For example, if the transistor Q9 is detected as being "on" for more than a few seconds in the absence of the AC keep alive signal, the alarm sounds and a characteristic failure code appears in the display. Conversely, if the transistor Q9 is "off" during a legitimate cook or clean cycle, the alarm also sounds with another code being displayed. This failure is not a safety concern, but the appliance will not cook under this condition, so the user is notified.

There is one more area of monitoring performed by the microcomputer U2 through the probe A/D scheme. Should a single component fault in the bake or broil relay driver circuits result in the microcomputer U2 being unable to shut the relays off during temperature regulation, the temperature in the oven will rise above the set point selected by the user. When the temperature reaches the bake or clean temperature limits, the microcomputer U2 stops the sustaining A.C. signal for the watchdog circuit 37, sounds an alarm, and displays an error code. The watchdog circuit 37 shuts off, removing power to the relays in that manner.

Thus, the watchdog circuitry inhibits operation in the event of a microcomputer failure and the microcomputer U2 protects against a hardware failure.

Thus, it can be seen that the watchdog circuitry 37 achieves the following.

1. Prevents application of power to external relays unless a mechanical key closure has occurred. The microcomputer U2 alone cannot activate the relay circuitry. The proper key S5, S7 or S8 must by physically pressed prior to the microcomputer U2 having control. In this manner, the system being controlled by this circuit 37 will not receive power unless the operator is present. This greatly minimizes the likelihood of an undesired operating mode being sustained for long periods of time. In the case of an oven being controlled by this circuit 37, the stove will not self start a bake, broil, or clean cycle and possibly exceed acceptable interior temperatures due to sustained heating element operation without regulation.

2. A single component failure will not result in the system self starting. The hardware guards against microcomputer U2 failures, while the microcomputer U2 guards against hardware failures. This is achieved through a unique feedback arrangement under software control.

3. Through software monitoring, any component failure that could result in the oven self starting should a second component fail, disables the system until repairs are made. This is achieved through audible and visual alarms that act as both a diagnostic tool to aid repair and as a deterrent to use the system in a marginally functional state.

4. Once started, the microcomputer U2 monitors its own inputs and will shut off the system should critical inputs fail in a manner that would prevent the operator from having control of operation through whatever input means is provided. (Keys, rotary switch, sensors, etc.)

5. A dynamic signal is required from the microcomputer U2 to sustain watchdog circuit operation. This signal is generated only if the various conditions being monitored in software are logically correct. Significant component failures during operation will result in system disabling.

6. Failures of external components such as power relays which provide switching for the heat or cooling sources are also monitored. An alarm will sound and a unique visual display presented if the temperature being sensed through the temperature sensor 39 does not agree with the set temperature within a predetermined tolerance. The operator may then intervene and shut down the system.

7. No comparator is required to achieve this function as in prior circuits.

8. The circuit 37 may be designed to have a controlled turn-on and turn off time through inexpensive value changes. As an example, during power interruptions the hardware will sustain enabling of the relay outputs for a controlled period of time. In this manner, brief power interruptions will not result in shut down of the system being controlled. This eliminates one of the most undesirable traits of many electronic control systems, which is the need to reprogram during common power dips of less than 5 seconds.

The basic operating principle of the watchdog circuit 37 is very straightforward. Transistor Q9, a 2N5308 or similar darlington transistor, and supporting circuitry, is used as an enabling switch that allows application of power to the relay driver transistors Q6 and Q7. Without transistor Q9 enabled, the external relays cannot turn on, even if the driver transistors Q6 and Q7 are on. Transistor Q9 is in series with the power source for the relay driver transistors Q6 and Q7.

The logic involved in keeping transistor Q9 enabled is not as straightforward. An A.C. signal must be generated at pin 58 of the microcomputer U2 to sustain the enabled state. This A.C. signal is generated only if predetermined logic conditions are met that involve many other circuits. This logic is controlled through the ROM software program stored in the microcomputer U2.

In order to describe the circuit function, it is first assumed that all logic conditions necessary to sustain the A.C. signal at pin 58 of the microcomputer U2 are being met and therefore the sequence to properly enable transistor Q9 is as follows.

A function key S5, S7 or S8 must be pressed that is coupled to the circuit through isolation diodes D11-D13. The watchdog monitor input pin 18 of the microcomputer U2 must be at a logic 1 state indicating that transistor Q9 is disabled (off). And the temperature sensor 39 must be indicating an acceptable starting temperature.

The only keys that may enable the watchdog transistor Q9 are the Bake, Broil, and Clean keys S8, S7 and S5. These keys have the isolation diodes connecting the key to the emitter of level shift transistor Q8. Pressing any one of these keys simultaneously applies a logic one to the microcomputer input associated with the function key, and causes current to flow in the base-emitter junction of transistor Q8.

For example when the Bake key S8 is pressed, the pin 33 of the microcomputer U2 is connected to circuit common through buffering resistor R34, placing a logic 1 on this input. Microcomputer U2 proceeds to check all monitored logic and if acceptable, starts to output alternating logic 1 and 0's at pin 58 of the microcomputer U2 at approximately a 120 hz rate. Simultaneously, the transistor Q8 circuit causes current to flow from the 27 volt, −VR power supply, through the series path of the Bake key S8, diode D13, transistor Q8 collector to emitter, diode D22, resistor R60, and capacitor C12. Capacitor C12 charges at a rapid rate as determined by the time constant of resistor R60 and capacitor C12. During the time the key S8 is pressed, transistor Q9 is enabled (collector of transistor Q9 at −VR potential) through the series path of diode D12, transistor Q8 collector to emitter, diode D22, resistor R59, and through the base to emitter junction of transistor Q9 to the −VR supply. Resistor R61 is the base to emitter resistor for transistor Q9 and insures that a controlled amount of current must flow through resistor R59 before the required 1.4 volts is developed across the transistor Q9 base to emitter junction required to enable transistor Q9. After the bake key S8 is released, transistor Q9 remains enabled due to two factors. The first factor is the charge impressed across capacitor C12 during the key press action. Depending on the duration of the key press, a substantial voltage will be impressed across capacitor C12. This voltage is divided down and appears across the transistor Q9 base to emitter junction through the voltage divider of resistors R60, R59 and R61, allowing transistor Q9 to remain enabled even after the key S8 is released. The capacitor C12 voltage begins to decay at a rate established by the time constant of resistors R60, R59, and to a lesser extent, resistor R61. When the charge across capacitor C12 decays to about 4.5 volts, transistor Q9 will again turn off. By varying the value of this time constant, transistor Q9 will continue to remain enabled for the desired period after removal of all sustaining input signals. The minimum requirement for the key press is approximately 50 milliseconds for proper circuit operation. The inherent closure time for a manually operated switch generally assures this duration, but if the switch is intentionally pressed for a very brief duration, the input pin 33 of the microcomputer U2 will not recognize that a valid key press has occurred, forcing the operator to repress the key to gain access to the function. This action again charges capacitor C12, assuring sufficient voltage is available to sustain circuit operation. Transistor Q9 will return to the disabled state unless the charge on capacitor C12 is reinforced at a faster rate than the discharge rate of resistors R60, R59 and R61. The second factor to sustain operation is the 120 hz signal generated by the microcomputer U2 at its output pin 58 and coupled to capacitor C12 through current limiting resistor R57 and coupling capacitor C11. When a logic 1 is output to pin 58 of microcomputer U2 current flows from pin 32 of microcomputer U2 through a FET transistor channel internal to the microcomputer U2, to pin 58 of the microcomputer U2 through resistor R57, capacitor C11, diode D20, and into capacitor C12. Due to the relative values of capacitors C11 and C12, an individual charge cycle only imparts about 0.3 of a volt additional charge to capacitor C12. This value varies depending on the voltage across capacitor C12, and the voltage of the −VR supply. Output pin 58 of the microcomputer U2 is able to source current to circuit common only, having only a FET channel connected to circuit common at pin 32 of microcomputer U2. A pull-down resistance is needed for the output to generate a logic 0. This pull-down resistance path is provided external to the microcomputer U2, through the path of diode D19, resistor R56, and the collector to emitter junction of transistor Q9. This mandates that transistor Q9 must first be enabled before pin 58 of microcomputer U2 can generate a logic 0 output. This fact is the basis on which the self-start logic protection is based. The watchdog circuit 37 must have an AC signal from pin 58 of the microcomputer U2 to sustain the enabled state of transistor Q9. The AC signal cannot be generated unless transistor Q9 is first enabled. The only way to do this without the AC signal is by pressing a function key and energizing transistor Q8, which in turn energizes transistor Q9. When pin 58 of the microcomputer U2 is instructed by software to output a logic 0, and transistor Q9 is on, a discharge path is provided for capacitor C11 through resistor R57, diode D19, resistor R56, transistor Q9 collector to emitter, and diode D21. Due to the relatively small value of capacitor C11, the capacitor C11 is nearly fully discharged prior to the next logic 1 output from pin 58 of the microcomputer U2 which allows additional current to flow into capacitor C12 with every return to logic 1 of pin 58 of the microcomputer U2. Capacitor C12 also discharges, but can only discharge into the transistor Q9 base to emitter circuit due to the blocking action of diodes D20 and D22. This path has a relatively long time constant. The amount capacitor C12 discharges is less than the amount capacitor C11 charged it on the previous positive going cycle of pin 58 of the microcomputer U2. As the 120 Hz AC signal continues out of pin 58 of the microcomputer U2, capacitor C11 gradually pumps up the voltage across capacitor C12. This voltage is approximately 14 VDC in this circuit arrangement and is the point at which the charging action of capacitor C11 into capacitor C12 exactly equals the discharge of capacitor C12 into the transistor Q9 base to emitter circuit. As long as the AC signal is present, the pumping action continues. If the microcomputer output remains in either logic state for an extended period of time, capacitor C12 will discharge, and transistor Q9 will become disabled when the voltage across capacitor C12 falls below about 4.5 VDC.

It is important to note that a single charge cycle of capacitor C11 into capacitor C12 cannot enable transistor Q9. If the microcomputer were to output the AC signal from its pin 58, without a key S5, S7 or S8 being pressed, capacitor C11 would become charged on the transition from logic 0 to logic 1. Since a single charge cycle does not impress enough voltage across a fully discharged capacitor C12 to enable transistor Q9, no pull down path is provided for pin 58 of the microcomputer U2. It will be unable to discharge capacitor C11 on the transition from logic 1 to logic 0 due to the incomplete discharge path. As a result, very little current flows on consecutive cycles of the AC signal. Capacitor C12 will not charge further, and transistor Q9 will remain disabled, not allowing power to reach external relays.

The logic state of the collector of transistor Q9 is continuously monitored by input pin 18 of the microcomputer U2 through buffer resistor R54. The software algorithm contained in microcomputer U2 is such that if the state of the collector of transistor Q9 is inappropriate for the present operating condition of the control, a hardware malfunction is assumed and a visual/audible alarm is generated. Basically the input must see a logic 1 during output off modes, and conversely must see a logic 0 for output on modes. Any failure of the watchdog components that either cause transistor Q9 to be in an inappropriately enabled or disabled state will cause the microcomputer U2 to inhibit the relay driver transistors Q7 and Q8. In this manner, single component failures will not cause self start of the relay outputs. In addition, the alarm will provide incentive to seek repair of the fault.

As mentioned previously, several circuits are monitored and must prove logically correct, or the AC signal generated at pin 58 of the microcomputer U2 will be inhibited under software control.

In particular, the real time 60 Hz reference signal at input pin 23 of the microcomputer U2 must be of a continuous nature. If no transitions are detected after 16 completions of the display update cycle, the signal stops. This protects against run on during operation of heat/cool functions due to lack of a timing signal. The cancel key input pin 48 of the microcomputer U2 must continue to see an AC signal generated by output pin 29 of the microcomputer U2 to sustain watchdog operation. Lack of this signal indicates the possible inability to sense the Cancel key S1 being pressed, which is the prime input for aborting active functions. The error detecting circuitry of the A/D converter 30 must be successfully producing an error free check of the A/D hardware. Errors of this circuit would not allow the control to properly maintain temperature so operation is ceased by disabling the watchdog. During clean modes in which very high temperatures are reached, the oven cavity door must remain locked to protect the user. Door lock input pin 59 of the microcomputer U2 must continue to see an AC signal generated by door strobe circuit transistor Q5 or the input is faulty. Any fault in this circuit would possibly prevent an accurate indication as to whether the oven door is locked. Clean mode operation is inhibited if this circuit malfunctions, also disabling the watchdog circuit. These types of error checks can be expanded for any application. Any critical circuit function that fails will result in the AC signal from output pin 58 of the microcomputer U2 being disabled.

Parameters that dictate the operation of BAKE, BROIL, and CLEAN mode are nominally programmed in the ROM memory of the single chip microcomputer U2. The EEPROM U3 stores values that offset these parameters. It is possible to operate the control unit 20 in an oven without the EEPROM U3. The EEPROM values are retained indefinitely when all power is removed which lends itself to the tailoring of a generic control to a particular customer's needs in short turn around time.

Values stored in the EEPROM U3 can only cause offsets to a maximum of plus/minus 35° F. when used with the control unit 20 of this invention, the usage of the non-volatile EEPROM memory is to retain operating parameters of the control unit 20 through software.

1. Bake mode parameters - relay on/off temperatures.

The ability to form specific relay on and off temperatures for a chosen cook temperature gives the ability to mimic any control system presently in use. It has been found that the control unit 20 can perform as replacement of, as well as surpass the performance of, mechanical thermostats.

A set temperature (T-set) chosen by the user from the rotary dial 24 as viewed in the red VFD digits of the display 22 will fall into either an Upper band or Lower band. The lower band is a range from the lower entry limit (170 nominal) to the Band Break point (300 nominal). The upper band is a range from the Band break to the upper entry limit (550 nominal). (FIG. 8) Two bands are desirable for optimal compensating of oven cavity losses at high temperatures vs. low temperatures while holding a precise temperature swing at lower temperatures.

When the bake mode starts, the EEPROM U3 is read and offsets apply to T-set to form T-set' which is compensation for center of oven to the sensor position. Optimally, the center cavity temperature is to be controlled to the T-set. The sensor is usually mounted off to a corner which causes gradients. Since these gradients are different between lower temperatures and higher ones, a T-set'H and T-set'L offset is used (FIG. 9).

Actual control of the heating element relays is done by comparing the A to D output temperature (T-act) inside the microcomputer U2 to T-on and T-off temperatures. These are formed by offsetting T-set' with separate EEPROM offset values for upper or lower band (FIG. 9). Relay energizes when T-act is less than T-on, deenergizes when T-act is greater than T-off. If T-on and T-off are spread, there will be hysteresis to prevent rapid relay switching which shortens its life as well as obtaining a predictable temperature envelope.

2. Bake mode parameters - Relay duty cycling.

Further precise control of temperature swing can be obtained by time duty cycling the heating element relays when calling for heat. The relay can be cycled in percentages controllable by varying on and off times in 1 second steps. These on/off times are stored in the EEPROM U3 and are formatted such that with an EEPROM fault or no EEPROM, on time is 100%.

3. Bake mode parameters - quarter top heat (QTH).

In many oven applications, more even and quicker heating can be obtained by implementing the broil (top) element as well as the bake (lower) element. In electromechanical oven systems, this is often done by applying quarter power to the broil element by applying 120 volts across a normally 240 volt operated element through a relay/mode switch arrangement. In the control unit 20, QTH is implemented by time duty cycling 240 volts to the broil element 25% (usually 15 sec on/45 sec off). Choosing QTH option as well as broadening the range for any percentage is implemented with stored values in the EEPROM U3.

4. Bake mode parameters - First rise compensation.

When a cold oven is activated for cooking, a large overshoot occurs after the set temperature is reached for the first time. This is due largely to the lagging effect of the sensor envelope mass.

To control this overshoot, a special first rise T-off temperature (T-offFR) is calculated as follows: if a new T-set is chosen that is 50 or more degrees higher than the present oven temperature (T-act) T-offFR will be used. Depending on which band the chosen T-set is in, a different factor for T-offFR is used.

In operation, when T-offFR is reached, the heating element(s) deactivate and a timer is started which tracks the coasting of the heater air into the desired control temperature band. When T-set is reached or the timer times out, normal T-on and T-off are reinstated and normal oven control occurs thereafter.

Values for determining T-offFR-Hi and T-offFR-Lo, offsetting the 50° difference comparing value (Hi and Lo bands), the coast timer are all stored in the EEPROM U3 (FIG. 10.)

5. Broil mode parameters.

Similar to bake, broil elements can be thermostatically controlled and time duty cycled separately. Relative multi-step user selectable broil settings can be implemented such as "LO-1-2-3-4-5-HI".

Figure 7:
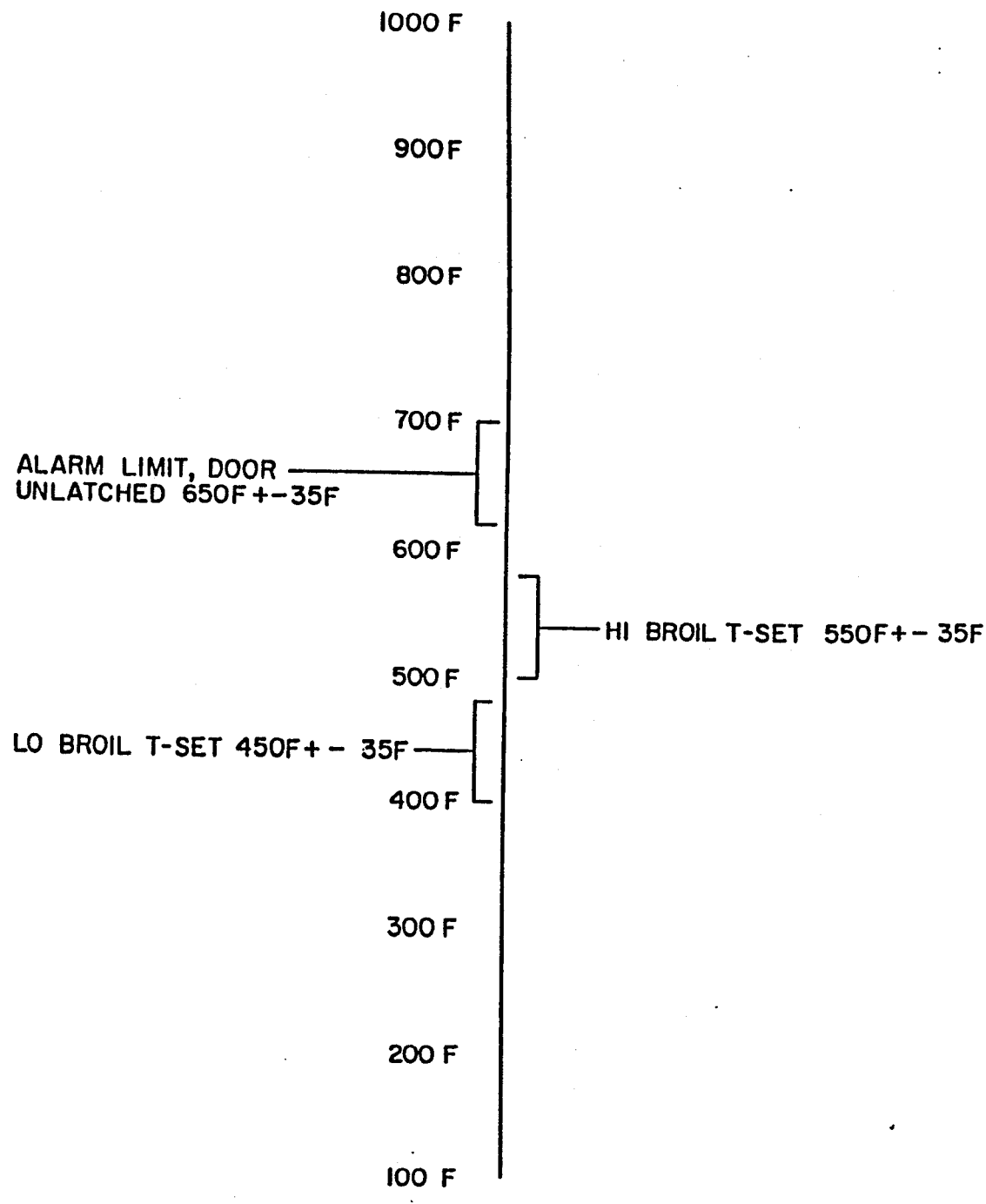
FIG. 7 is a bar graph that illustrates the broil mode temperature action points of the control unit of FIG. 1

Typically, broil is executed with the oven door open which prevents a T-off from ever being reached. To reduce the power applied, therefore, the element on-time percentage is reduced for lower settings. T-off and T-on temperatures are also used in case the door is closed and are not typically user selectable. (FIG. 7)

This multi-step format is suited for electric ovens. For gas applications, time duty cycling does not lend itself due to unpredictable ignition times, therefore only one broil setting is desirable.

Values for on-times for each step, T-on and T-off offsets up to plus/minus 35°, how many steps or one step selection are all stored in the EEPROM U3 such that they offset nominals in the ROM of the microcomputer U2.

6. Clean mode parameters.

Clean operation cycle format can be arranged by choosing options and values to be stored in the EEPROM U3. Much flexibility is available to match any oven configuration.

A user selects a clean duration from the front panel. Limits for the duration are EEPROM settable. A fixed duration may be implemented. Typical durations are two to four hours.

The cycle is arranged in up to 3 timed stages not apparent to the user. One of the two oven heating elements is the primary for a given stage with the secondary element off or time duty cycled. The first two stages are typically heating cycles with the third being a cool down time.

Values for the stage durations, which elements are used, duty cycle times, clean T-on and T-off temperatures, number of stages are all stored in the EEPROM U3.

Figure 6:
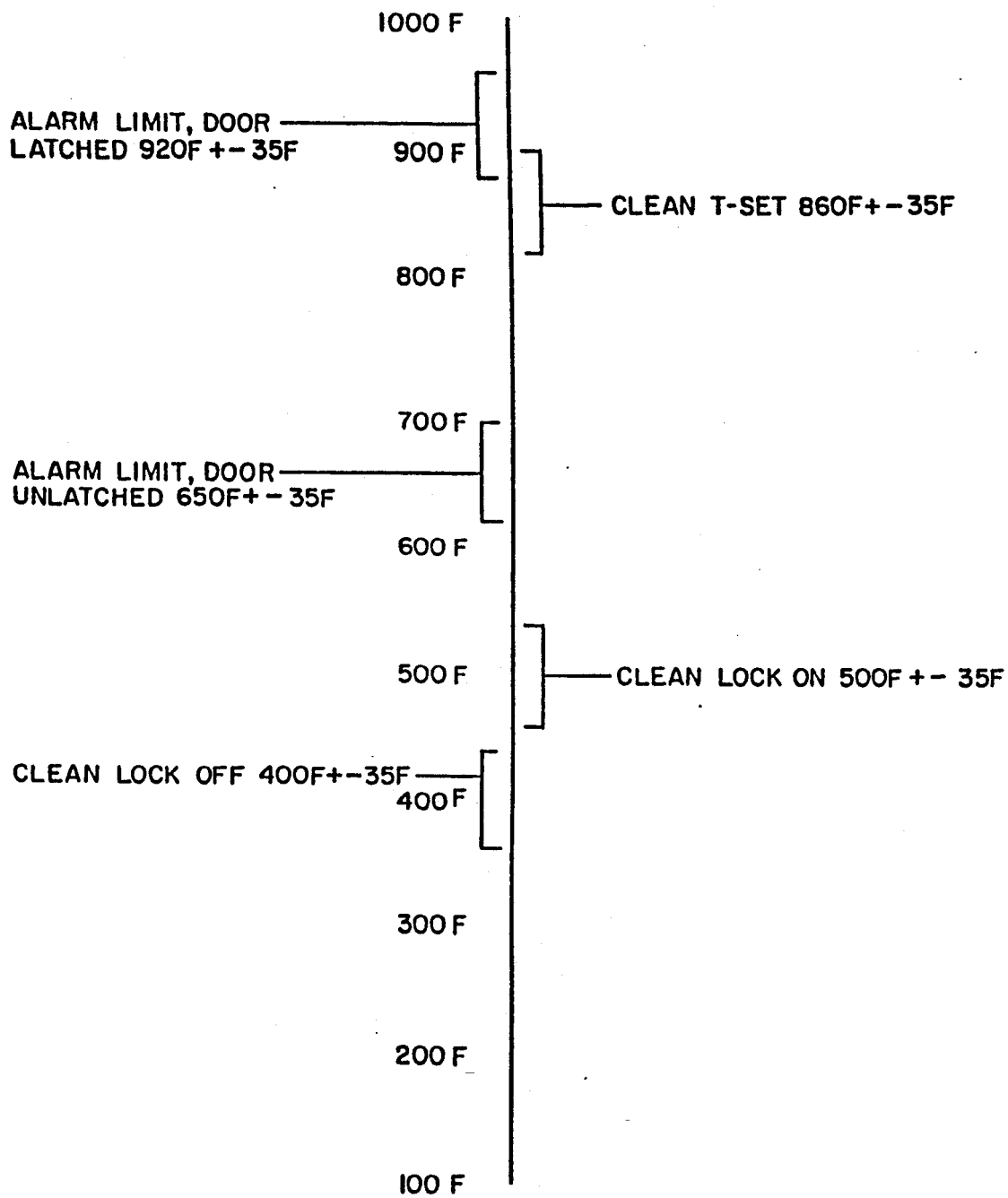
FIG. 6 is a bar graph that illustrates the clean mode temperature action points of the control unit of FIG. 1.

Clean temperatures are high enough such that locking the door is required. Door lock status is indicated to the user with an annunciator on the front panel. The temperatures where the annunciator goes on and off are stored in the EEPROM U3 and set to correlate to a thermal mechanical latch without any connection to it. (FIG. 6)

7. Time of day clock retention.

A typical oven control includes a time-of-day clock user feature. A mechanical clock freezes at its setting when power is removed. Electronic clocks loose the setting and return to a consistent preset time. Mechanical clocks have the advantage to the user in cases of short power losses where negligible amounts of time are lost.

The electronic clock can realize this advantage if the time digits are stored in the EEPROM U3 at the first sign of power loss. Upon power restoration, the stored digits are read, displayed and used. In this way, the mechanical system performance is duplicated and surpassed because the digits can flash at power up to indicate time was lost.

Power loss is detected by sensing the loss of an incoming 60 Hz power line signal. When line power is lost, enough DC power is stored in power supply capacitors to support the microcomputer U2 for several seconds while the present time digits are stored.

8. Control integrity.

The EEPROM U3 can be used to support the overall quality of the control unit 20.

Figure 8:
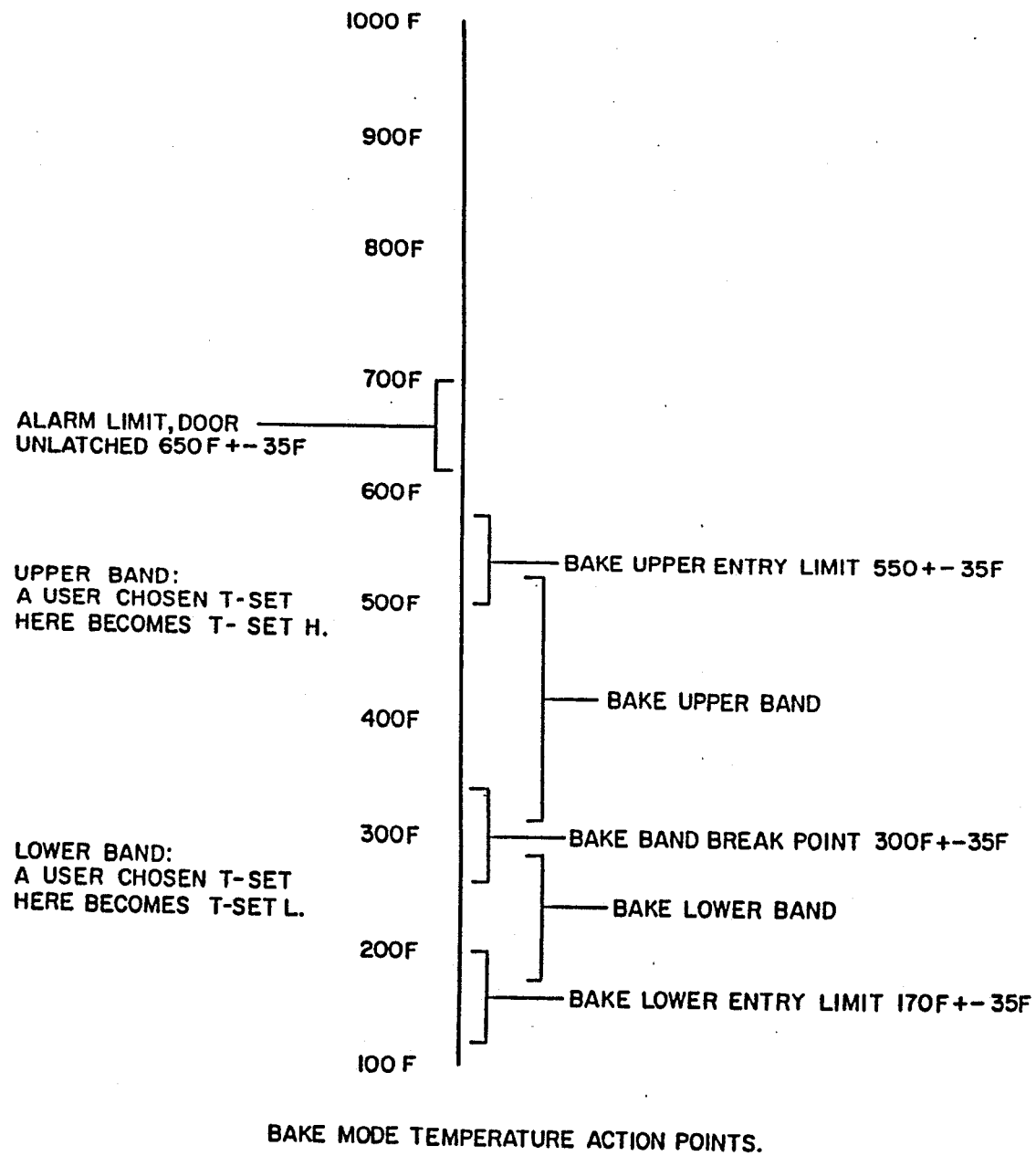
FIG. 8 is a bar graph that illustrates the bake mode temperature action points of the control unit of FIG. 1.

Support of redundancy/backup circuits described elsewhere is accomplished by storing values for hi temperature alarm thresholds. Standards require backup temperatures that give a shutdown and user apparent alarm when reached. These thresholds are stored in the EEPROM U3 and are changeable to track changable T-set values for the various modes. (FIGS. 6-8).

At time of manufacture, the A to D circuitry 30 is calibrated to offset component tolerances. An offset value is stored in the EEPROM U3 in lieu of a more typical potentiometer adjustment. The offset procedure includes limits of 35°.

Also at time of manufacture or field service, a check can be made of all important EEPROM values through a procedure known as checksum. All permanent EEPROM values are added together and the least significant two digits of the sum are displayed for test comparison. If no match is seen, it is assumed the EEPROM data is bad and must be reprogrammed or replaced. Statistically, this method catches a very high percentage of faults.

9. Changing EEPROM data in-circuit.

A program is included in the software of the microcomputer U2 for the control unit 20 that allows access to all EEPROM locations in their raw format using front panel display and keys. This program is not available to the consumer and is accessed through a user unknown method. The program can read and write all locations of the EEPROM U3.

An alternate method of in-circuit programming is via an externally connected computer. Typically, the external computer interface is connected in place of the keyboard of the control unit 20 and data can be read and written through the connector of the microcomputer U2 to and from the EEPROM U3.

The external method is useful for "off the shelf" tailoring of controls for quick turn around manufacturing testing and secure field accessing (must have the external computer).

While FIGS. 4A-4D of the drawings show certain values for the various electrical components of one working embodiment of this invention, it is to be understood that other values could be utilized if desired. Nevertheless, in FIGS. 4A-4D, unless otherwise noted, all diodes are IN4004, all capacitance values are in microfarods, 50 V, 20% and all resistance values are in ohms, 0.25 W,5%.

A method of utilizing the power of the microcomputer U2 to aid in user convenience or friendliness is provided by the control unit 20. Not only can the microcomputer U2 sort out and track the necessary timers and temperature controls, the microcomputer U2, through its software, can be programmed to do certain calculations as an aid to user programming.

No. 1 - Rotary Dial Usage

The control unit 20 uses a rotary dial 24 as a means for entering data. Other typical electronic controls use a 10-digit key pad. The use of the dial 24 allows instantaneous entry limit checking allowing the user instant entry of valid digits. With the prior known key pad, any digits may be entered and are normally evaluated with a subsequent key action resulting in two or more steps. If erroneous data has been entered the user will have to start over. The dial 24 clearly has the advantage. Programming and oven cook duration is a feature of the control unit 20 of this invention utilizing the instant entry scheme provided by the rotary selector 24 and when the cook duration times out, the oven heating elements are deenergized and the user is notified with a beep.

No. 2 - Oven Time

A user may choose to think of cook duration in terms of a length of time. If this is the case, the user may use the rotary dial 24 to enter oven time in terms of hours and minutes length starting now as a time of entry. The control unit 20 will then regulate the oven to a selected set temperature for this duration.

No. 3 - Stop Time

The user may choose to think of cook duration in terms of the time of day now which is at a time of programming until some later time of day. If this is the case the user may enter a stop time in terms of time of day with the rotary selector 24.

No. 4 - Priority Scheme

If an oven time is programmed, the microcomputer U2 will generate a stop time on its own. This time is available for user review and changing as desired. Changes to the generated stop time are limited such that the programmed oven time is not shortened. This is considered oven time priority. If a stop time is programmed, the microcomputer U2 will generate an oven time on its own. This time is available for user review and changing as desired. Changes to the generated oven time are limited such that the program stop time is not moved to a later point. This is considered stop time priority.

No. 5 - Programming a Delay

A delay until cooking starts may be programmed by the user of the control unit 20 if desired. Delayed programming is an enhancement of oven time or stop time programming and follows either chosen program. If that oven time is programmed, the generated stop time may be recalled and advanced. This action advances the block of oven time such that it ends at the chosen stop time. If a stop time is programmed the generated oven time may be recalled and shortened. This action decreases the block of oven time such that it ends at the programmed stop time.

Thus, it can be seen that this invention provides a new control unit and a new method of making such a control unit.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a temperature regulating control system for controlling the operations of a cooking apparatus that has an oven, said system comprising a RTD temperature sensor means that is adapted to sense the temperature in said oven, means for applying electrical signal means to said sensor means, and a microcomputer means for receiving digital signal means from said sensor means in relation to the temperature being sensed by said sensor means, the improvement wherein said means for applying electrical signal means to said sensor means comprises means adapted to apply a varying voltage to said sensor means from a starting voltage to an ending voltage which has caused said microcomputer means to determine that said ending voltage has produced a current level through said sensor means that is indicative of the actual temperature being sensed by said sensor means at that time.

2. A control system as set forth in claim 1 wherein said means for applying electrical signal means to said sensor means comprises an operational amplifier.

3. A control system as set forth in claim 2 wherein said means for applying electrical signal means to said sensor means comprises a resistance ladder network.

4. A control system as set forth in claim 1 wherein said means adapted to apply a varying voltage to said sensor means is adapted to apply said voltage in steps.

5. A control system as set forth in claim 4 wherein said means adapted to apply a varying voltage comprises comparator means to compare the current flow through said sensor means at each step of voltage change with a reference current.

6. A control system as set forth in claim 5 wherein said comparator means is adapted to send a digital signal means to said microcomputer means when said current flow through said sensor means is substantially equal to said reference current.

7. A control system as set forth in claim 6 wherein said means adapted to apply a varying voltage to said sensor means comprises an operational amplifier.

8. A control system as set forth in claim 7 wherein said means adapted to apply a varying voltage to said sensor means in said steps comprises a resistance ladder network.

9. A control system as set forth in claim 1 wherein said ending voltage is either larger in magnitude or smaller in magnitude than the magnitude of said starting voltage.

* * * * *